US008200975B2

(12) United States Patent
O'Connor et al.

(10) Patent No.: US 8,200,975 B2
(45) Date of Patent: Jun. 12, 2012

(54) DIGITAL SIGNATURES FOR NETWORK FORMS

(75) Inventors: Brian G. O'Connor, Seattle, WA (US); Kalpita S. Deobhakta, Redmond, WA (US); Silviu Ifrim, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1147 days.

(21) Appl. No.: 11/170,521

(22) Filed: Jun. 29, 2005

(65) Prior Publication Data

US 2007/0005978 A1 Jan. 4, 2007

(51) Int. Cl.
| H04L 9/32 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 3/00 | (2006.01) |

(52) U.S. Cl. .................. 713/176; 715/242; 715/740
(58) Field of Classification Search .................. None
See application file for complete search history.

(56) References Cited

U.S. PATENT DOCUMENTS

| 2,804,878 A | 9/1957 | Fishwood et al. |
| 3,091,077 A | 5/1963 | Erickson et al. |
| 3,104,520 A | 9/1963 | Cazier et al. |
| 3,195,805 A | 7/1965 | Cholvin et al. |
| 3,196,606 A | 7/1965 | Cholvin et al. |
| 3,812,942 A | 5/1974 | Espenschied et al. |
| 3,874,828 A | 4/1975 | Herschler et al. |
| 3,961,748 A | 6/1976 | McNabney |
| 4,005,578 A | 2/1977 | McNebney |
| 4,005,579 A | 2/1977 | Lloyd |
| 4,060,340 A | 11/1977 | Yanik et al. |
| 4,089,623 A | 5/1978 | Hofmann, Jr. |
| 4,201,978 A | 5/1980 | Nally |
| 4,256,019 A | 3/1981 | Braddick |
| 4,362,475 A | 12/1982 | Seitz |
| 4,391,184 A | 7/1983 | Yamane et al. |

(Continued)

FOREIGN PATENT DOCUMENTS

AU 2006200285 1/2011

(Continued)

OTHER PUBLICATIONS

Pacheco, Xavier et al., "Delphi 5 Developer's Guide", Sams Publishing. Chapter 31, Section: Data Streaming,(1999),4.

(Continued)

*Primary Examiner* — Kaveh Abrishamkar
*Assistant Examiner* — Nadia Khoshnoodi

(57) ABSTRACT

Systems and/or methods enabling an individual to digitally sign data using an identifier where the data being digitally signed and the identifier are not accessed at the same location are described. In some cases, the systems and/or methods permit an individual to digitally sign data for an electronic document using an identifier inaccessible by a remote computer where the electronic document is rendered using view information from that remote computer. The systems and/or methods may also enable a network computer to send view information for, and a digital encoding of, an electronic document to a local computer effective to enable the local computer to digitally sign the electronic document by signing the digital encoding of electronic document.

19 Claims, 6 Drawing Sheets

U.S. PATENT DOCUMENTS

| | | |
|---|---|---|
| 4,396,345 A | 8/1983 | Hutchinson |
| 4,498,147 A | 2/1985 | Agnew et al. |
| 4,514,800 A | 4/1985 | Gruner et al. |
| 4,514,985 A | 5/1985 | Cadeddu |
| 4,564,752 A | 1/1986 | Lepic et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,783,648 A | 11/1988 | Homma et al. |
| 4,815,029 A | 3/1989 | Barker et al. |
| 4,847,749 A | 7/1989 | Collins et al. |
| 4,910,663 A | 3/1990 | Bailey |
| 4,926,476 A | 5/1990 | Covey |
| 4,933,880 A | 6/1990 | Borgendale et al. |
| 4,962,475 A | 10/1990 | Hernandez et al. |
| 4,975,690 A | 12/1990 | Torres |
| 5,025,484 A | 6/1991 | Yamanari et al. |
| 5,072,412 A | 12/1991 | Henderson, Jr. et al. |
| 5,140,563 A | 8/1992 | Thinesen |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,257,646 A | 11/1993 | Meyer |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffernan et al. |
| 5,381,547 A | 1/1995 | Flug et al. |
| 5,388,967 A | 2/1995 | Firnhaber et al. |
| 5,388,968 A | 2/1995 | Wood et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,428,738 A | 6/1995 | Carter et al. |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,456,582 A | 10/1995 | Firnhaber et al. |
| 5,459,865 A | 10/1995 | Heninger et al. |
| 5,463,726 A | 10/1995 | Price |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,537,596 A | 7/1996 | Yu et al. |
| 5,540,558 A | 7/1996 | Harden et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,556,271 A | 9/1996 | Zuercher et al. |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,613,837 A | 3/1997 | Konishi et al. |
| 5,625,783 A | 4/1997 | Ezekiel et al. |
| 5,627,979 A | 5/1997 | Chang et al. |
| 5,630,126 A | 5/1997 | Redpath |
| 5,630,706 A | 5/1997 | Yang |
| 5,634,113 A | 5/1997 | Rusterholz |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,655,887 A | 8/1997 | Chou |
| 5,659,729 A | 8/1997 | Nielsen |
| 5,664,133 A | 9/1997 | Malamud et al. |
| 5,664,178 A | 9/1997 | Sinofsky |
| 5,664,938 A | 9/1997 | Yang |
| 5,668,966 A | 9/1997 | Ono et al. |
| 5,669,005 A | 9/1997 | Curbow et al. |
| 5,681,151 A | 10/1997 | Wood |
| 5,682,536 A | 10/1997 | Atkinson et al. |
| 5,689,667 A | 11/1997 | Kurtenbach |
| 5,689,703 A | 11/1997 | Atkinson et al. |
| 5,692,540 A | 12/1997 | Huang |
| 5,704,029 A | 12/1997 | Wright, Jr. |
| 5,706,501 A | 1/1998 | Horikiri et al. |
| 5,717,939 A | 2/1998 | Bricklin et al. |
| 5,720,016 A | 2/1998 | Egashira |
| 5,721,824 A | 2/1998 | Taylor |
| 5,734,380 A | 3/1998 | Adams et al. |
| 5,740,439 A | 4/1998 | Atkinson et al. |
| 5,742,504 A | 4/1998 | Meyer et al. |
| 5,742,795 A | 4/1998 | Kussel |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,785,081 A | 7/1998 | Krawczyk et al. |
| 5,787,274 A | 7/1998 | Agrawal et al. |
| 5,790,796 A | 8/1998 | Sadowsky |
| 5,796,403 A | 8/1998 | Adams et al. |
| 5,798,757 A | 8/1998 | Smith |
| 5,799,311 A | 8/1998 | Agrawal et al. |
| 5,801,701 A | 9/1998 | Koppolu et al. |
| 5,801,702 A | 9/1998 | Dolan et al. |
| 5,802,304 A | 9/1998 | Stone |
| 5,803,715 A | 9/1998 | Kitchener |
| 5,805,824 A | 9/1998 | Kappe |
| 5,806,079 A | 9/1998 | Rivette et al. |
| 5,815,830 A | 9/1998 | Anthony |
| 5,825,359 A | 10/1998 | Derby et al. |
| 5,826,031 A | 10/1998 | Nielsen |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,854,630 A | 12/1998 | Nielsen |

| | | | | | | |
|---|---|---|---|---|---|---|
| 5,859,973 A | 1/1999 | Carpenter et al. | | 6,144,969 A | 11/2000 | Inokuchi et al. |
| 5,862,372 A | 1/1999 | Morris et al. | | 6,151,624 A | 11/2000 | Teare et al. |
| 5,862,379 A | 1/1999 | Rubin et al. | | 6,154,128 A | 11/2000 | Wookey et al. |
| 5,864,819 A | 1/1999 | De Armas et al. | | 6,161,107 A | 12/2000 | Stern |
| 5,870,735 A | 2/1999 | Agrawal et al. | | 6,163,772 A | 12/2000 | Kramer et al. |
| 5,873,088 A | 2/1999 | Hayashi et al. | | 6,167,521 A | 12/2000 | Smith et al. |
| 5,875,815 A | 3/1999 | Ungerecht et al. | | 6,167,523 A | 12/2000 | Strong |
| 5,905,492 A | 5/1999 | Straub et al. | | 6,178,551 B1 | 1/2001 | Sana et al. |
| 5,907,621 A | 5/1999 | Bachman et al. | | 6,182,094 B1 | 1/2001 | Humpleman et al. |
| 5,907,704 A | 5/1999 | Gudmundson et al. | | 6,182,095 B1 | 1/2001 | Leymaster et al. |
| 5,910,895 A | 6/1999 | Proskauer et al. | | 6,188,401 B1 | 2/2001 | Peyer |
| 5,911,776 A | 6/1999 | Guck | | 6,191,797 B1 | 2/2001 | Politis |
| 5,915,112 A | 6/1999 | Boutcher | | 6,192,367 B1 | 2/2001 | Hawley et al. |
| 5,919,247 A | 7/1999 | Van Hoff et al. | | 6,195,661 B1 | 2/2001 | Filepp et al. |
| 5,922,072 A | 7/1999 | Hutchinson et al. | | 6,199,204 B1 | 3/2001 | Donohue |
| 5,928,363 A | 7/1999 | Ruvolo | | 6,209,128 B1 | 3/2001 | Gerard et al. |
| 5,929,858 A | 7/1999 | Shibata et al. | | 6,216,152 B1 | 4/2001 | Wong et al. |
| RE36,281 E | 8/1999 | Zuercher et al. | | 6,219,423 B1 * | 4/2001 | Davis ............................. 380/268 |
| 5,940,075 A | 8/1999 | Mutschler, III et al. | | 6,219,698 B1 | 4/2001 | Iannucci et al. |
| 5,947,711 A | 9/1999 | Myers et al. | | 6,225,996 B1 | 5/2001 | Gibb et al. |
| 5,950,010 A | 9/1999 | Hesse et al. | | 6,235,027 B1 | 5/2001 | Herzon |
| 5,950,221 A | 9/1999 | Draves et al. | | 6,243,088 B1 | 6/2001 | McCormack et al. |
| 5,953,731 A | 9/1999 | Glaser | | 6,247,016 B1 | 6/2001 | Rastogi et al. |
| 5,956,481 A | 9/1999 | Walsh et al. | | 6,253,366 B1 | 6/2001 | Mutschler, III |
| 5,960,199 A | 9/1999 | Brodsky et al. | | 6,253,374 B1 | 6/2001 | Dresevic et al. |
| 5,963,208 A | 10/1999 | Dolan et al. | | 6,263,313 B1 | 7/2001 | Milsted et al. |
| 5,963,964 A | 10/1999 | Nielsen | | 6,266,810 B1 | 7/2001 | Tanaka et al. |
| 5,973,696 A | 10/1999 | Agranat et al. | | 6,268,852 B1 | 7/2001 | Lindhorst et al. |
| 5,974,454 A | 10/1999 | Apfel et al. | | 6,275,227 B1 | 8/2001 | DeStefano |
| 5,982,370 A | 11/1999 | Kamper | | 6,275,599 B1 | 8/2001 | Adler et al. |
| 5,983,348 A | 11/1999 | Ji | | 6,279,042 B1 | 8/2001 | Ouchi |
| 5,987,480 A | 11/1999 | Donohue et al. | | 6,281,896 B1 | 8/2001 | Alimpich et al. |
| 5,991,710 A | 11/1999 | Papineni et al. | | 6,282,709 B1 | 8/2001 | Reha et al. |
| 5,991,731 A | 11/1999 | Colon et al. | | 6,282,711 B1 | 8/2001 | Halpern et al. |
| 5,991,877 A | 11/1999 | Luckenbaugh | | 6,286,033 B1 | 9/2001 | Kishinsky et al. |
| 5,995,103 A | 11/1999 | Ashe | | 6,286,130 B1 | 9/2001 | Poulsen et al. |
| 5,999,740 A | 12/1999 | Rowley | | 6,292,897 B1 | 9/2001 | Gennaro et al. |
| 6,005,570 A | 12/1999 | Gayraud et al. | | 6,292,941 B1 | 9/2001 | Jollands |
| 6,006,227 A | 12/1999 | Freeman et al. | | 6,297,819 B1 | 10/2001 | Furst |
| 6,006,241 A | 12/1999 | Purnaveja et al. | | 6,300,948 B1 | 10/2001 | Geller et al. |
| 6,012,066 A | 1/2000 | Discount et al. | | 6,307,955 B1 | 10/2001 | Zank et al. |
| 6,014,135 A | 1/2000 | Fernandes | | 6,308,179 B1 | 10/2001 | Petersen et al. |
| 6,016,520 A | 1/2000 | Facq et al. | | 6,308,273 B1 | 10/2001 | Goertzel et al. |
| 6,018,743 A | 1/2000 | Xu | | 6,311,221 B1 | 10/2001 | Raz et al. |
| 6,021,403 A | 2/2000 | Horvitz et al. | | 6,311,271 B1 | 10/2001 | Gennaro et al. |
| 6,026,379 A | 2/2000 | Haller et al. | | 6,314,415 B1 | 11/2001 | Mukherjee |
| 6,026,416 A | 2/2000 | Kanerva et al. | | 6,321,259 B1 | 11/2001 | Ouellette et al. |
| 6,031,989 A | 2/2000 | Cordell et al. | | 6,321,334 B1 | 11/2001 | Jerger et al. |
| 6,035,297 A | 3/2000 | Van Huben et al. | | 6,327,628 B1 | 12/2001 | Anuff et al. |
| 6,035,309 A | 3/2000 | Dauerer et al. | | 6,331,864 B1 | 12/2001 | Coco et al. |
| 6,044,205 A | 3/2000 | Reed et al. | | 6,336,214 B1 | 1/2002 | Sundaresan |
| 6,052,531 A | 4/2000 | Waldin et al. | | 6,336,797 B1 | 1/2002 | Kazakis et al. |
| 6,052,710 A | 4/2000 | Saliba et al. | | 6,342,907 B1 | 1/2002 | Petty et al. |
| 6,054,987 A | 4/2000 | Richardson | | 6,343,149 B1 | 1/2002 | Motoiwa |
| 6,057,837 A | 5/2000 | Hatakeda et al. | | 6,343,302 B1 | 1/2002 | Graham |
| 6,058,413 A | 5/2000 | Flores et al. | | 6,343,377 B1 | 1/2002 | Gessner et al. |
| 6,065,043 A | 5/2000 | Domenikos et al. | | 6,344,862 B1 | 2/2002 | Williams et al. |
| 6,069,626 A | 5/2000 | Cline et al. | | 6,345,256 B1 | 2/2002 | Milsted et al. |
| 6,070,184 A | 5/2000 | Blount et al. | | 6,345,278 B1 | 2/2002 | Hitchcock et al. |
| 6,072,870 A | 6/2000 | Nguyen et al. | | 6,345,361 B1 | 2/2002 | Jerger et al. |
| 6,078,326 A | 6/2000 | Kilmer et al. | | 6,347,323 B1 | 2/2002 | Garber et al. |
| 6,078,327 A | 6/2000 | Liman et al. | | 6,349,408 B1 | 2/2002 | Smith |
| 6,078,924 A | 6/2000 | Ainsbury et al. | | 6,351,574 B1 | 2/2002 | Yair et al. |
| 6,081,610 A | 6/2000 | Dwork et al. | | 6,353,851 B1 | 3/2002 | Anupam et al. |
| 6,084,585 A | 7/2000 | Kraft et al. | | 6,353,926 B1 | 3/2002 | Parthesarathy et al. |
| 6,088,679 A | 7/2000 | Barkley | | 6,356,906 B1 | 3/2002 | Lippert et al. |
| 6,088,708 A | 7/2000 | Burch et al. | | 6,357,038 B1 | 3/2002 | Scouten |
| 6,091,417 A | 7/2000 | Lefkowitz | | 6,366,907 B1 | 4/2002 | Fanning et al. |
| 6,094,657 A | 7/2000 | Hailpern et al. | | 6,366,912 B1 | 4/2002 | Wallent et al. |
| 6,096,096 A | 8/2000 | Murphy et al. | | 6,367,013 B1 | 4/2002 | Bisbee et al. |
| 6,098,081 A | 8/2000 | Heidorn et al. | | 6,369,840 B1 | 4/2002 | Barnett et al. |
| 6,105,012 A * | 8/2000 | Chang et al. ..................... 705/64 | | 6,369,841 B1 | 4/2002 | Salomon et al. |
| 6,106,570 A | 8/2000 | Mizuhara | | 6,374,402 B1 | 4/2002 | Schmeidler et al. |
| 6,108,637 A | 8/2000 | Blumenau | | 6,381,742 B2 | 4/2002 | Forbes et al. |
| 6,108,783 A | 8/2000 | Krawczyk et al. | | 6,381,743 B1 | 4/2002 | Mutschler, III |
| 6,115,044 A | 9/2000 | Alimpich et al. | | 6,385,767 B1 | 5/2002 | Ziebell |
| 6,115,646 A | 9/2000 | Fiszman et al. | | 6,389,434 B1 | 5/2002 | Rivette et al. |
| 6,121,965 A | 9/2000 | Kenney et al. | | 6,393,442 B1 | 5/2002 | Cromarty et al. |
| 6,122,647 A | 9/2000 | Horowitz et al. | | 6,393,456 B1 | 5/2002 | Ambler et al. |

| | | |
|---|---|---|
| 6,393,469 B1 | 5/2002 | Dozier et al. |
| 6,396,488 B1 | 5/2002 | Simmons et al. |
| 6,397,264 B1 | 5/2002 | Stasnick et al. |
| 6,401,077 B1 | 6/2002 | Godden et al. |
| 6,405,221 B1 | 6/2002 | Levine et al. |
| 6,405,238 B1 | 6/2002 | Votipka |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,421,777 B1 | 7/2002 | Pierre-Louis |
| 6,425,125 B1 | 7/2002 | Fries et al. |
| 6,427,142 B1 | 7/2002 | Zachary et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,434,743 B1 | 8/2002 | Click et al. |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,006 B1 | 12/2002 | Gourdol et al. |
| 6,493,007 B1 | 12/2002 | Pang |
| 6,493,702 B1 | 12/2002 | Adar et al. |
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan et al. |
| 6,505,300 B2 | 1/2003 | Chan et al. |
| 6,505,344 B1 | 1/2003 | Blais et al. |
| 6,507,856 B1 | 1/2003 | Chen et al. |
| 6,513,154 B1 | 1/2003 | Porterfield |
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 | 3/2003 | Lee et al. |
| 6,539,464 B1 | 3/2003 | Getov |
| RE38,070 E | 4/2003 | Spies et al. |
| 6,546,546 B1 | 4/2003 | Van Doorn |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,559,966 B1 | 5/2003 | Laverty et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,574,655 B1 | 6/2003 | Libert et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,604,238 B1 | 8/2003 | Lim et al. |
| 6,606,606 B2 | 8/2003 | Starr |
| 6,609,200 B2 | 8/2003 | Anderson et al. |
| 6,611,812 B2 | 8/2003 | Hurtado et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,625,622 B1 | 9/2003 | Henrickson et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,845 B2 | 10/2003 | Chau et al. |
| 6,640,249 B1 | 10/2003 | Bowman-Amuah |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,658,652 B1 | 12/2003 | Alexander et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,625 B1 | 1/2004 | Reise et al. |
| 6,678,717 B1 | 1/2004 | Schneider |
| 6,681,370 B2 | 1/2004 | Gounares et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,710,789 B1 | 3/2004 | Sekiguchi et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,735,721 B1 | 5/2004 | Morrow et al. |
| 6,738,783 B2 | 5/2004 | Melli et al. |
| 6,745,367 B1 | 6/2004 | Bates et al. |
| 6,748,385 B1 | 6/2004 | Rodkin |
| 6,748,569 B1 | 6/2004 | Brooke et al. |
| 6,751,777 B2 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,757,890 B1 | 6/2004 | Wallman |
| 6,760,723 B2 | 7/2004 | Oshinsky et al. |
| 6,763,343 B1 | 7/2004 | Brooke et al. |
| 6,766,526 B1 | 7/2004 | Ellis |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,806,892 B1 | 10/2004 | Plow et al. |
| 6,816,849 B1 | 11/2004 | Halt, Jr. |
| 6,823,478 B1 | 11/2004 | Prologo et al. |
| 6,828,992 B1 | 12/2004 | Freeman et al. |
| 6,829,745 B2 | 12/2004 | Yassin et al. |
| 6,833,925 B1 | 12/2004 | Igoe et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,130 B1 | 3/2005 | Baweja et al. |

| | | | | | | |
|---|---|---|---|---|---|---|
| 6,874,143 B1 | 3/2005 | Murray et al. | | 7,236,982 B2 | 6/2007 | Zlatanov et al. |
| 6,876,996 B2 | 4/2005 | Czajkowski et al. | | 7,237,114 B1 * | 6/2007 | Rosenberg .................... 713/176 |
| 6,883,168 B1 | 4/2005 | James et al. | | 7,249,328 B1 | 7/2007 | Davis |
| 6,885,748 B1 | 4/2005 | Wang | | 7,251,777 B1 | 7/2007 | Valtchev et al. |
| 6,889,359 B1 | 5/2005 | Conner et al. | | 7,269,664 B2 | 9/2007 | Hutsch et al. |
| 6,901,403 B1 | 5/2005 | Bata et al. | | 7,269,788 B2 | 9/2007 | Gharavy |
| 6,915,454 B1 | 7/2005 | Moore et al. | | 7,272,815 B1 | 9/2007 | Eldridge |
| 6,925,609 B1 | 8/2005 | Lucke | | 7,275,216 B2 | 9/2007 | Paoli et al. |
| 6,931,532 B1 | 8/2005 | Davis et al. | | 7,281,018 B1 | 10/2007 | Begun et al. |
| 6,941,129 B2 | 9/2005 | Marce et al. | | 7,281,206 B2 | 10/2007 | Schnelle et al. |
| 6,941,510 B1 | 9/2005 | Ozzie et al. | | 7,281,245 B2 | 10/2007 | Reynar et al. |
| 6,941,511 B1 | 9/2005 | Hind et al. | | 7,284,208 B2 | 10/2007 | Matthews |
| 6,941,521 B2 | 9/2005 | Lin et al. | | 7,284,239 B1 | 10/2007 | Young et al. |
| 6,948,129 B1 | 9/2005 | Loghmani | | 7,287,218 B1 | 10/2007 | Knotz et al. |
| 6,948,133 B2 | 9/2005 | Haley | | 7,293,268 B2 | 11/2007 | Masuda et al. |
| 6,948,135 B1 | 9/2005 | Ruthfield et al. | | 7,295,336 B2 | 11/2007 | Yoshida et al. |
| 6,950,980 B1 | 9/2005 | Malcolm | | 7,296,017 B2 | 11/2007 | Larcheveque et al. |
| 6,950,987 B1 | 9/2005 | Hargraves et al. | | 7,305,613 B2 | 12/2007 | Oezgen |
| 6,957,395 B1 | 10/2005 | Jobs et al. | | 7,308,646 B1 | 12/2007 | Cohen et al. |
| 6,961,897 B1 | 11/2005 | Peel, Jr. et al. | | 7,313,757 B2 | 12/2007 | Bradley et al. |
| 6,963,875 B2 | 11/2005 | Moore et al. | | 7,313,758 B2 | 12/2007 | Kozlov |
| 6,968,503 B1 | 11/2005 | Chang et al. | | 7,316,003 B1 | 1/2008 | Dulepet et al. |
| 6,968,505 B2 | 11/2005 | Stoll et al. | | 7,318,237 B2 | 1/2008 | Moriconi et al. |
| 6,993,714 B2 | 1/2006 | Kaler et al. | | 7,337,391 B2 | 2/2008 | Clarke et al. |
| 6,993,722 B1 | 1/2006 | Greer et al. | | 7,337,392 B2 | 2/2008 | Lue |
| 6,996,776 B1 | 2/2006 | Makely et al. | | 7,346,610 B2 | 3/2008 | Ruthfield et al. |
| 6,996,781 B1 | 2/2006 | Myers et al. | | 7,346,840 B1 | 3/2008 | Ravishankar et al. |
| 7,000,179 B2 | 2/2006 | Yankovich et al. | | 7,346,848 B1 | 3/2008 | Ruthfield et al. |
| 7,002,560 B2 | 2/2006 | Graham | | 7,350,141 B2 | 3/2008 | Kotler et al. |
| 7,003,548 B1 | 2/2006 | Barck et al. | | 7,370,066 B1 | 5/2008 | Sikchi et al. |
| 7,003,722 B2 | 2/2006 | Rothchiller et al. | | 7,373,595 B2 | 5/2008 | Jones et al. |
| 7,010,580 B1 | 3/2006 | Fu et al. | | 7,376,673 B1 | 5/2008 | Chalecki et al. |
| 7,013,340 B1 | 3/2006 | Burd et al. | | 7,406,660 B1 | 7/2008 | Sikchi et al. |
| 7,020,869 B2 | 3/2006 | Abrari et al. | | 7,412,649 B2 | 8/2008 | Emek et al. |
| 7,024,417 B1 | 4/2006 | Russakovsky et al. | | 7,424,671 B2 | 9/2008 | Elza et al. |
| 7,032,170 B2 | 4/2006 | Poulose | | 7,428,699 B1 | 9/2008 | Kane et al. |
| 7,036,072 B1 | 4/2006 | Sulistio et al. | | 7,430,711 B2 | 9/2008 | Rivers-Moore et al. |
| 7,039,875 B2 | 5/2006 | Khalfay et al. | | 7,441,200 B2 | 10/2008 | Savage |
| 7,043,687 B2 | 5/2006 | Knauss et al. | | 7,451,392 B1 | 11/2008 | Chalecki et al. |
| 7,043,688 B1 | 5/2006 | Tsutsumi et al. | | 7,490,109 B1 | 2/2009 | Sikchi et al. |
| 7,051,273 B1 | 5/2006 | Holt et al. | | 7,490,167 B2 | 2/2009 | Pena et al. |
| 7,058,645 B2 | 6/2006 | Seto et al. | | 7,496,632 B2 | 2/2009 | Chapman et al. |
| 7,058,663 B2 | 6/2006 | Johnston et al. | | 7,496,837 B1 | 2/2009 | Larcheveque et al. |
| 7,062,764 B2 | 6/2006 | Cohen et al. | | 7,512,896 B2 | 3/2009 | Rockey et al. |
| 7,065,493 B1 | 6/2006 | Homsi | | 7,516,145 B2 | 4/2009 | Sikchi et al. |
| 7,076,728 B2 | 7/2006 | Davis et al. | | 7,516,399 B2 | 4/2009 | Hsu et al. |
| 7,080,083 B2 | 7/2006 | Kim et al. | | 7,533,268 B1 | 5/2009 | Catorcini |
| 7,080,325 B1 | 7/2006 | Treibach-Heck et al. | | 7,543,228 B2 | 6/2009 | Kelkar |
| 7,081,882 B2 | 7/2006 | Sowden et al. | | 7,549,115 B2 | 6/2009 | Kotler |
| 7,086,009 B2 | 8/2006 | Resnick et al. | | 7,562,215 B2 | 7/2009 | Cummins |
| 7,086,042 B2 | 8/2006 | Abe et al. | | 7,568,101 B1 | 7/2009 | Catorcini |
| 7,088,374 B2 | 8/2006 | David et al. | | 7,581,177 B1 | 8/2009 | Mollicone et al. |
| 7,100,147 B2 | 8/2006 | Miller et al. | | 7,584,417 B2 | 9/2009 | Friend |
| 7,103,611 B2 | 9/2006 | Murthy et al. | | 7,610,562 B2 | 10/2009 | Rockey et al. |
| 7,106,888 B1 | 9/2006 | Silverbrook et al. | | 7,613,996 B2 | 11/2009 | Dallett et al. |
| 7,107,282 B1 | 9/2006 | Yalamanchi | | 7,624,356 B1 | 11/2009 | Rockey et al. |
| 7,107,521 B2 | 9/2006 | Santos | | 7,653,687 B2 | 1/2010 | Reisman |
| 7,107,522 B1 | 9/2006 | Morgan et al. | | 7,669,116 B2 | 2/2010 | Lopata et al. |
| 7,107,539 B2 | 9/2006 | Abbott et al. | | 7,673,227 B2 | 3/2010 | Kotler |
| 7,120,863 B1 | 10/2006 | Wang | | 7,673,228 B2 | 3/2010 | Kelkar |
| 7,124,167 B1 | 10/2006 | Bellotti et al. | | 7,676,843 B1 | 3/2010 | Stott et al. |
| 7,124,251 B1 | 10/2006 | Clark et al. | | 7,689,929 B1 | 3/2010 | Ruthfield |
| 7,130,885 B2 | 10/2006 | Chandra et al. | | 7,692,636 B2 | 4/2010 | Kim |
| 7,134,083 B1 | 11/2006 | Guerrero | | 7,712,022 B2 | 5/2010 | Smuga |
| 7,143,341 B1 | 11/2006 | Kohli | | 7,712,048 B2 | 5/2010 | Rockey et al. |
| 7,146,564 B2 | 12/2006 | Kim et al. | | 7,721,190 B2 | 5/2010 | Sikchi |
| 7,152,027 B2 | 12/2006 | Andrade et al. | | 7,725,834 B2 | 5/2010 | Bell et al. |
| 7,152,205 B2 | 12/2006 | Day et al. | | 7,743,063 B2 | 6/2010 | James et al. |
| 7,159,011 B1 | 1/2007 | Knight et al. | | 7,755,786 B2 | 7/2010 | Foehr et al. |
| 7,168,035 B1 | 1/2007 | Bell et al. | | 7,774,620 B1 | 8/2010 | Stott |
| 7,178,166 B1 | 2/2007 | Taylor et al. | | 7,779,027 B2 | 8/2010 | James |
| 7,190,376 B1 | 3/2007 | Tonisson | | 7,809,698 B1 | 10/2010 | Salz et al. |
| 7,191,394 B1 | 3/2007 | Ardeleanu et al. | | 7,818,677 B2 | 10/2010 | Ruthfield |
| 7,197,515 B2 | 3/2007 | Rivers-Moore et al. | | 7,865,477 B2 | 1/2011 | Larcheveque |
| 7,200,665 B2 | 4/2007 | Eshghi et al. | | 7,900,134 B2 | 3/2011 | Ardeleanu |
| 7,200,816 B2 | 4/2007 | Falk et al. | | 7,913,159 B2 | 3/2011 | Larcheveque |
| 7,213,200 B2 | 5/2007 | Abe et al. | | 7,925,621 B2 | 4/2011 | Sikchi |
| 7,228,541 B2 | 6/2007 | Gupton et al. | | 7,934,098 B1 * | 4/2011 | Hahn et al. .................... 713/176 |
| 7,234,105 B2 | 6/2007 | Bezrukov et al. | | 7,937,651 B2 | 5/2011 | Kelkar |

| | | |
|---|---|---|
| 7,971,139 B2 | 6/2011 | Stanciu et al. |
| 7,979,856 B2 | 7/2011 | Murray et al. |
| 8,001,459 B2 | 8/2011 | Rivers-Moore et al. |
| 8,010,515 B2 | 8/2011 | Mirzad |
| 8,074,217 B2 | 12/2011 | James |
| 8,117,552 B2 | 2/2012 | Paoli |
| 2001/0003828 A1 | 6/2001 | Peterson et al. |
| 2001/0007109 A1 | 7/2001 | Lange |
| 2001/0013947 A1 | 8/2001 | Van Der Linden et al. |
| 2001/0016880 A1 | 8/2001 | Cai et al. |
| 2001/0022592 A1 | 9/2001 | Alimpich et al. |
| 2001/0024195 A1 | 9/2001 | Hayakawa |
| 2001/0037345 A1 | 11/2001 | Kiernan et al. |
| 2001/0044850 A1 | 11/2001 | Raz et al. |
| 2001/0047372 A1 | 11/2001 | Gorelik et al. |
| 2001/0051928 A1 | 12/2001 | Brody |
| 2001/0052121 A1 | 12/2001 | Masuda et al. |
| 2001/0054004 A1 | 12/2001 | Powers |
| 2001/0056411 A1* | 12/2001 | Lindskog et al. ............... 705/76 |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk et al. |
| 2002/0010855 A1 | 1/2002 | Reshef et al. |
| 2002/0013788 A1 | 1/2002 | Pennell et al. |
| 2002/0019941 A1 | 2/2002 | Chan et al. |
| 2002/0023111 A1 | 2/2002 | Arora et al. |
| 2002/0023113 A1 | 2/2002 | Hsing et al. |
| 2002/0026441 A1 | 2/2002 | Kutay et al. |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0040469 A1 | 4/2002 | Pramberger |
| 2002/0049790 A1 | 4/2002 | Ricker et al. |
| 2002/0052769 A1 | 5/2002 | Navani et al. |
| 2002/0053021 A1* | 5/2002 | Rice et al. ............... 713/155 |
| 2002/0054115 A1 | 5/2002 | Mack et al. |
| 2002/0054126 A1 | 5/2002 | Gamon |
| 2002/0054128 A1 | 5/2002 | Lau et al. |
| 2002/0057297 A1 | 5/2002 | Grimes et al. |
| 2002/0059566 A1 | 5/2002 | Delcambre et al. |
| 2002/0065798 A1 | 5/2002 | Bostleman et al. |
| 2002/0065847 A1 | 5/2002 | Furukawa et al. |
| 2002/0065950 A1 | 5/2002 | Katz et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0083145 A1 | 6/2002 | Perinpanathan |
| 2002/0083148 A1 | 6/2002 | Shaw et al. |
| 2002/0083318 A1 | 6/2002 | Larose |
| 2002/0091738 A1 | 7/2002 | Rohrabaugh et al. |
| 2002/0099952 A1 | 7/2002 | Lambert et al. |
| 2002/0100027 A1 | 7/2002 | Binding et al. |
| 2002/0103711 A1 | 8/2002 | Karas et al. |
| 2002/0107885 A1 | 8/2002 | Brooks et al. |
| 2002/0111699 A1 | 8/2002 | Melli et al. |
| 2002/0111932 A1 | 8/2002 | Roberge et al. |
| 2002/0112224 A1 | 8/2002 | Cox |
| 2002/0129056 A1 | 9/2002 | Conant |
| 2002/0133484 A1 | 9/2002 | Chau et al. |
| 2002/0143815 A1 | 10/2002 | Sather |
| 2002/0147726 A1 | 10/2002 | Yehia et al. |
| 2002/0147748 A1 | 10/2002 | Huang |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174147 A1 | 11/2002 | Wang et al. |
| 2002/0174417 A1 | 11/2002 | Sijacic et al. |
| 2002/0178187 A1* | 11/2002 | Rasmussen et al. .......... 707/513 |
| 2002/0178380 A1 | 11/2002 | Wolf et al. |
| 2002/0184188 A1 | 12/2002 | Mandyam et al. |
| 2002/0184213 A1 | 12/2002 | Lau et al. |
| 2002/0184219 A1 | 12/2002 | Preisig et al. |
| 2002/0184401 A1 | 12/2002 | Kadel, Jr. et al. |
| 2002/0184485 A1* | 12/2002 | Dray et al. ............... 713/150 |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0194388 A1 | 12/2002 | Boloker et al. |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0020746 A1 | 1/2003 | Chen et al. |
| 2003/0023641 A1 | 1/2003 | Gorman et al. |
| 2003/0023674 A1 | 1/2003 | Hildebrand |
| 2003/0023953 A1 | 1/2003 | Lucassen et al. |
| 2003/0025693 A1 | 2/2003 | Haley |
| 2003/0025732 A1 | 2/2003 | Prichard |
| 2003/0026507 A1 | 2/2003 | Zlotnick |
| 2003/0028550 A1 | 2/2003 | Lee et al. |
| 2003/0029911 A1 | 2/2003 | Kitayama |
| 2003/0033037 A1 | 2/2003 | Yuen et al. |
| 2003/0037021 A1 | 2/2003 | Krothappalli et al. |
| 2003/0037303 A1 | 2/2003 | Bodlaender et al. |
| 2003/0038788 A1 | 2/2003 | Demartines et al. |
| 2003/0038846 A1 | 2/2003 | Hori et al. |
| 2003/0043986 A1 | 3/2003 | Creamer et al. |
| 2003/0046665 A1 | 3/2003 | Llin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe et al. |
| 2003/0058286 A1 | 3/2003 | Dando |
| 2003/0061386 A1 | 3/2003 | Brown et al. |
| 2003/0061567 A1 | 3/2003 | Brown et al. |
| 2003/0069881 A1 | 4/2003 | Huttunen |
| 2003/0074279 A1 | 4/2003 | Viswanath |
| 2003/0084424 A1 | 5/2003 | Reddy et al. |
| 2003/0093755 A1 | 5/2003 | O'Carroll |
| 2003/0101414 A1 | 5/2003 | Liu et al. |
| 2003/0110443 A1 | 6/2003 | Yankovich et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0140160 A1 | 7/2003 | Raz et al. |
| 2003/0142072 A1 | 7/2003 | Lapstun et al. |
| 2003/0149934 A1 | 8/2003 | Worden |
| 2003/0154464 A1 | 8/2003 | Ullmann et al. |
| 2003/0158897 A1 | 8/2003 | Ben-Natan et al. |
| 2003/0163285 A1 | 8/2003 | Nakamura et al. |
| 2003/0167277 A1 | 9/2003 | Hejlsberg et al. |
| 2003/0172113 A1 | 9/2003 | Cameron et al. |
| 2003/0182268 A1 | 9/2003 | Lal |
| 2003/0182327 A1 | 9/2003 | Ramanujam et al. |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0200254 A1 | 10/2003 | Wei |
| 2003/0200506 A1 | 10/2003 | Abe et al. |
| 2003/0204481 A1 | 10/2003 | Lau |
| 2003/0204511 A1 | 10/2003 | Brundage |
| 2003/0204814 A1 | 10/2003 | Elo et al. |
| 2003/0205615 A1 | 11/2003 | Marappan |
| 2003/0210428 A1 | 11/2003 | Bevlin et al. |
| 2003/0212664 A1 | 11/2003 | Breining et al. |

| | | |
|---|---|---|
| 2003/0212902 A1 | 11/2003 | van der Made |
| 2003/0212988 A1 | 11/2003 | Tsai et al. |
| 2003/0217053 A1 | 11/2003 | Bachman et al. |
| 2003/0218620 A1 | 11/2003 | Lai et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri et al. |
| 2003/0225829 A1 | 12/2003 | Pena et al. |
| 2003/0226111 A1 | 12/2003 | Wirts et al. |
| 2003/0226132 A1 | 12/2003 | Tondreau et al. |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0236903 A1 | 12/2003 | Piotrowski |
| 2003/0237046 A1 | 12/2003 | Parker et al. |
| 2003/0237047 A1 | 12/2003 | Borson |
| 2004/0002939 A1 | 1/2004 | Arora |
| 2004/0002950 A1 | 1/2004 | Brennan et al. |
| 2004/0003031 A1 | 1/2004 | Brown et al. |
| 2004/0003341 A1 | 1/2004 | alSafadi et al. |
| 2004/0003353 A1 | 1/2004 | Rivera et al. |
| 2004/0003389 A1 | 1/2004 | Reynar et al. |
| 2004/0006744 A1 | 1/2004 | Jones et al. |
| 2004/0010752 A1 | 1/2004 | Chan et al. |
| 2004/0010753 A1 | 1/2004 | Salter |
| 2004/0015778 A1 | 1/2004 | Britton et al. |
| 2004/0015783 A1 | 1/2004 | Lennon et al. |
| 2004/0024842 A1 | 2/2004 | Witt |
| 2004/0030991 A1 | 2/2004 | Hepworth et al. |
| 2004/0032611 A1 | 2/2004 | Daly et al. |
| 2004/0039881 A1 | 2/2004 | Shoebridge et al. |
| 2004/0039990 A1 | 2/2004 | Bakar et al. |
| 2004/0039993 A1 | 2/2004 | Kougiouris et al. |
| 2004/0044961 A1 | 3/2004 | Pesenson |
| 2004/0044965 A1 | 3/2004 | Toyama et al. |
| 2004/0046787 A1 | 3/2004 | Henry et al. |
| 2004/0046789 A1 | 3/2004 | Inanoria |
| 2004/0047643 A1 | 3/2004 | Jackelen et al. |
| 2004/0054966 A1 | 3/2004 | Busch et al. |
| 2004/0059754 A1 | 3/2004 | Barghout et al. |
| 2004/0060006 A1 | 3/2004 | Lindblad et al. |
| 2004/0073565 A1 | 4/2004 | Kaufman et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088320 A1 | 5/2004 | Perry |
| 2004/0088647 A1 | 5/2004 | Miller et al. |
| 2004/0088652 A1 | 5/2004 | Abe et al. |
| 2004/0093596 A1 | 5/2004 | Koyano |
| 2004/0107367 A1 | 6/2004 | Kisters |
| 2004/0111418 A1 | 6/2004 | Nguyen et al. |
| 2004/0117769 A1 | 6/2004 | Lauzon et al. |
| 2004/0123277 A1 | 6/2004 | Schrader et al. |
| 2004/0128296 A1 | 7/2004 | Krishnamurthy et al. |
| 2004/0139400 A1 | 7/2004 | Allam et al. |
| 2004/0146199 A1 | 7/2004 | Berkner et al. |
| 2004/0148178 A1 | 7/2004 | Brain |
| 2004/0148514 A1 | 7/2004 | Fee et al. |
| 2004/0148571 A1 | 7/2004 | Lue |
| 2004/0162741 A1 | 8/2004 | Flaxer et al. |
| 2004/0163041 A1 | 8/2004 | Engel |
| 2004/0163046 A1 | 8/2004 | Chu et al. |
| 2004/0172442 A1 | 9/2004 | Ripley |
| 2004/0181543 A1 | 9/2004 | Wu et al. |
| 2004/0181711 A1 | 9/2004 | Johnson et al. |
| 2004/0186762 A1 | 9/2004 | Beaven et al. |
| 2004/0189716 A1 | 9/2004 | Paoli et al. |
| 2004/0193465 A1 | 9/2004 | Sangroniz et al. |
| 2004/0194035 A1 | 9/2004 | Chakraborty |
| 2004/0196266 A1 | 10/2004 | Matsuura et al. |
| 2004/0199572 A1 | 10/2004 | Hunt et al. |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler et al. |
| 2004/0205592 A1 | 10/2004 | Huang |
| 2004/0205605 A1 | 10/2004 | Adler et al. |
| 2004/0205644 A1 | 10/2004 | Shaughnessy et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |
| 2004/0210645 A1 | 10/2004 | Kouznetsov et al. |
| 2004/0216084 A1 | 10/2004 | Brown et al. |
| 2004/0220912 A1 | 11/2004 | Manikutty et al. |
| 2004/0221238 A1 | 11/2004 | Cifra et al. |
| 2004/0221245 A1 | 11/2004 | Chickles et al. |
| 2004/0237030 A1 | 11/2004 | Malkin |
| 2004/0260593 A1 | 12/2004 | Abraham-Fuchs et al. |
| 2004/0261019 A1 | 12/2004 | Imamura et al. |
| 2004/0261032 A1 | 12/2004 | Olander et al. |
| 2004/0268229 A1 | 12/2004 | Paoli et al. |
| 2004/0268259 A1 | 12/2004 | Rockey et al. |
| 2004/0268260 A1 | 12/2004 | Rockey et al. |
| 2005/0004893 A1 | 1/2005 | Sangroniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0027757 A1 | 2/2005 | Kiessig et al. |
| 2005/0028073 A1 | 2/2005 | Henry et al. |
| 2005/0033626 A1 | 2/2005 | Kruse et al. |
| 2005/0033728 A1 | 2/2005 | James |
| 2005/0038711 A1 | 2/2005 | Marlelo |
| 2005/0050066 A1* | 3/2005 | Hughes ........................ 707/100 |
| 2005/0055627 A1 | 3/2005 | Lloyd et al. |
| 2005/0060324 A1 | 3/2005 | Johnson et al. |
| 2005/0060647 A1 | 3/2005 | Doan et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076022 A1 | 4/2005 | Wu et al. |
| 2005/0076049 A1 | 4/2005 | Qubti et al. |
| 2005/0080801 A1 | 4/2005 | Kothandaraman et al. |
| 2005/0091285 A1 | 4/2005 | Krishnan et al. |
| 2005/0091305 A1 | 4/2005 | Lange et al. |
| 2005/0097536 A1 | 5/2005 | Bernstein et al. |
| 2005/0102370 A1 | 5/2005 | Lin et al. |
| 2005/0102612 A1 | 5/2005 | Allan et al. |
| 2005/0108624 A1 | 5/2005 | Carrier |
| 2005/0114757 A1 | 5/2005 | Sahota et al. |
| 2005/0114764 A1 | 5/2005 | Gudenkauf et al. |
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1 | 6/2005 | Pecht-Seibert |
| 2005/0138539 A1 | 6/2005 | Bravery et al. |
| 2005/0149375 A1 | 7/2005 | Wefers |
| 2005/0149726 A1 | 7/2005 | Joshi et al. |
| 2005/0159136 A1 | 7/2005 | Rouse et al. |
| 2005/0160398 A1 | 7/2005 | Bjornson et al. |
| 2005/0171746 A1 | 8/2005 | Thalhammer-Reyero |
| 2005/0183006 A1 | 8/2005 | Rivers-Moore et al. |
| 2005/0198086 A1 | 9/2005 | Moore et al. |
| 2005/0198125 A1 | 9/2005 | Beck et al. |
| 2005/0198247 A1 | 9/2005 | Perry et al. |
| 2005/0210263 A1 | 9/2005 | Levas et al. |
| 2005/0223063 A1 | 10/2005 | Chang et al. |
| 2005/0223320 A1 | 10/2005 | Brintzenhofe et al. |
| 2005/0234890 A1 | 10/2005 | Enzler et al. |
| 2005/0240620 A1 | 10/2005 | Danner et al. |
| 2005/0240876 A1 | 10/2005 | Myers et al. |
| 2005/0246304 A1 | 11/2005 | Knight et al. |
| 2005/0256933 A1 | 11/2005 | Millington et al. |
| 2005/0257148 A1 | 11/2005 | Goodman et al. |
| 2005/0262112 A1 | 11/2005 | Moore |
| 2005/0268217 A1 | 12/2005 | Garrison |
| 2005/0268222 A1 | 12/2005 | Cheng |
| 2006/0004910 A1 | 1/2006 | Burd et al. |
| 2006/0010386 A1 | 1/2006 | Khan |
| 2006/0020586 A1 | 1/2006 | Prompt et al. |
| 2006/0020883 A1 | 1/2006 | Kothari et al. |
| 2006/0026500 A1 | 2/2006 | Qa'Im-maqami' |
| 2006/0026534 A1 | 2/2006 | Ruthfield et al. |
| 2006/0031757 A9 | 2/2006 | Vincent |
| 2006/0036995 A1 | 2/2006 | Chickles et al. |
| 2006/0041593 A1 | 2/2006 | Borthakur et al. |

| | | | | | | |
|---|---|---|---|---|---|---|
| 2006/0041838 | A1 | 2/2006 | Khan | JP | 04290126 | 10/1992 |
| 2006/0059107 | A1 | 3/2006 | Elmore et al. | JP | 5314152 | 11/1993 |
| 2006/0059434 | A1 | 3/2006 | Boss et al. | JP | 406014105 | 1/1994 |
| 2006/0069605 | A1 | 3/2006 | Hatoun | JP | 6139241 | 5/1994 |
| 2006/0069985 | A1 | 3/2006 | Friedman et al. | JP | 6180697 | 6/1994 |
| 2006/0074981 | A1 | 4/2006 | Mauceri | JP | 6180698 | 6/1994 |
| 2006/0075245 | A1* | 4/2006 | Meier .......................... 713/176 | JP | 08263246 | 10/1996 |
| 2006/0080657 | A1 | 4/2006 | Goodman | JP | 08263247 | 10/1996 |
| 2006/0085409 | A1 | 4/2006 | Rys et al. | JP | 09016801 | 1/1997 |
| 2006/0101037 | A1 | 5/2006 | Brill et al. | JP | 09134273 | 5/1997 |
| 2006/0101051 | A1 | 5/2006 | Carr et al. | JP | 09146736 | 6/1997 |
| 2006/0107206 | A1 | 5/2006 | Koskimies | JP | 09190327 | 7/1997 |
| 2006/0129978 | A1 | 6/2006 | Abrari et al. | JP | 09251370 | 9/1997 |
| 2006/0136422 | A1 | 6/2006 | Matveief et al. | JP | 09292967 | 11/1997 |
| 2006/0143220 | A1 | 6/2006 | Spencer, Jr. | JP | 10011255 | 1/1998 |
| 2006/0155857 | A1 | 7/2006 | Feenan et al. | JP | 10097559 | 4/1998 |
| 2006/0161559 | A1 | 7/2006 | Bordawekar et al. | JP | 10171662 | 6/1998 |
| 2006/0161837 | A1 | 7/2006 | Kelkar et al. | JP | 10207805 | 8/1998 |
| 2006/0173865 | A1 | 8/2006 | Fong | JP | 10232754 | 9/1998 |
| 2006/0184393 | A1 | 8/2006 | Ewin et al. | JP | 10240434 | 9/1998 |
| 2006/0191662 | A1 | 8/2006 | Deibl et al. | JP | 10260765 | 9/1998 |
| 2006/0195413 | A1 | 8/2006 | Davis et al. | JP | 2000029713 | 1/2000 |
| 2006/0200754 | A1 | 9/2006 | Kablesh et al. | JP | 2000132436 | 5/2000 |
| 2006/0203081 | A1 | 9/2006 | Pulitzer | JP | 2002183652 | 6/2002 |
| 2006/0230363 | A1 | 10/2006 | Rapp | JP | 2003173288 | 6/2003 |
| 2006/0248468 | A1 | 11/2006 | Constantine et al. | JP | 200329635 | 10/2003 |
| 2006/0271839 | A1 | 11/2006 | Gottlieb et al. | JP | 2003316769 | 11/2003 |
| 2007/0005611 | A1 | 1/2007 | Takasugi et al. | JP | 2003337648 | 11/2003 |
| 2007/0036433 | A1 | 2/2007 | Teutsch | JP | 2004054749 | 2/2004 |
| 2007/0050719 | A1 | 3/2007 | Lui et al. | JP | 2004341675 | 12/2004 |
| 2007/0061467 | A1 | 3/2007 | Essey | JP | 4833490 | 9/2011 |
| 2007/0061706 | A1 | 3/2007 | Cupala | RU | 2413987 | 3/2011 |
| 2007/0074106 | A1 | 3/2007 | Ardeleanu | WO | WO 99/24945 | 5/1999 |
| 2007/0088554 | A1 | 4/2007 | Harb et al. | WO | WO-9924945 | 5/1999 |
| 2007/0094589 | A1 | 4/2007 | Paoli | WO | WO 99/56207 | 11/1999 |
| 2007/0100877 | A1 | 5/2007 | Paoli | WO | WO-9956207 | 11/1999 |
| 2007/0100967 | A1 | 5/2007 | Smith et al. | WO | WO 01/44934 | 6/2001 |
| 2007/0101280 | A1 | 5/2007 | Paoli | WO | WO-0144934 | 6/2001 |
| 2007/0118538 | A1 | 5/2007 | Ahern et al. | WO | WO0157720 | 9/2006 |
| 2007/0118803 | A1 | 5/2007 | Walker et al. | | | |
| 2007/0130500 | A1 | 6/2007 | Rivers-Moore et al. | | | |
| 2007/0130504 | A1 | 6/2007 | Betancourt et al. | | | |
| 2007/0186157 | A1 | 8/2007 | Walker et al. | | | |
| 2007/0208606 | A1 | 9/2007 | MacKay et al. | | | |
| 2007/0208769 | A1 | 9/2007 | Boehm et al. | | | |
| 2007/0276768 | A1* | 11/2007 | Pallante .......................... 705/78 | | | |
| 2008/0021916 | A1 | 1/2008 | Schnelle et al. | | | |
| 2008/0027896 | A1 | 1/2008 | Anjur | | | |
| 2008/0028340 | A1 | 1/2008 | Davis | | | |
| 2008/0040635 | A1 | 2/2008 | Larcheveque | | | |
| 2008/0052287 | A1 | 2/2008 | Stanciu | | | |
| 2008/0126402 | A1 | 5/2008 | Sikchi et al. | | | |
| 2008/0134162 | A1 | 6/2008 | James | | | |
| 2008/0162498 | A1 | 7/2008 | Omoigui | | | |
| 2008/0189335 | A1 | 8/2008 | Sikchi | | | |
| 2008/0222514 | A1 | 9/2008 | Rivers-Moore | | | |
| 2009/0043798 | A1 | 2/2009 | Tan et al. | | | |
| 2009/0044103 | A1 | 2/2009 | Chalecki et al. | | | |
| 2009/0070411 | A1 | 3/2009 | Chang et al. | | | |
| 2009/0119580 | A1 | 5/2009 | Rohrabaugh et al. | | | |
| 2009/0138389 | A1 | 5/2009 | Barthel | | | |
| 2009/0177961 | A1 | 7/2009 | Fortini | | | |
| 2010/0125788 | A1 | 5/2010 | Kelkar et al. | | | |
| 2010/0229110 | A1 | 9/2010 | Rockey et al. | | | |
| 2011/0173560 | A1 | 7/2011 | Larcheveque et al. | | | |
| 2011/0239101 | A1 | 9/2011 | Rivers-Moore | | | |
| 2011/0246868 | A1 | 10/2011 | Stanciu | | | |

FOREIGN PATENT DOCUMENTS

| | | |
|---|---|---|
| EP | 0841615 | 5/1998 |
| EP | 0841615 | 11/1999 |
| EP | 0961197 | 12/1999 |
| EP | 1076290 | 2/2001 |
| EP | 1221661 | 7/2002 |
| JP | 63085960 | 4/1988 |
| JP | 401173140 | 7/1989 |
| JP | 401173140 A | 7/1989 |
| JP | 3191429 | 8/1991 |
| JP | 4225466 | 8/1992 |

OTHER PUBLICATIONS

Atova, "User Reference manual Version 4.4, XML Spy suite 4.4," Atova Ges.m.b.H and Altova, Inc., May 24, 2002, pages cover, copyright page, 1-565.

Altova, Inc., "XML Spy 4.0 Manual," Altova Inc. & Altova GmbH, coyright 1998-2001, Chapters 1, 2, and 6, encompassing pp. 1-17, 18-90, and 343-362.

Altova et al. XML Spy, XML integrated Development Environments, Altova Inc., 2002, pp. 1-18.

Ben-Natan, U.S. Appl. No. 60/203,081, filed May 19, 2000, entitled "Internet platform for creating and supporting communities".

Excel Developer Tip (hereinafter "Excel"), "Determining the Data Type of a Cell", May 13, 1998, p. 1 (available at http://jwalk.com/ssllexcel/tips/tip62.htm).

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.

Kutay, U.S. Appl. No. 60/209,713, filed Jun. 5, 2000, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

"Enter Key", Retrieved from the Internet at http://systems.webopedia.com/TERM/Enter_key.html on Dec. 20, 2006.

"Microsoft Visual Basic 5.0 Programmers Guide", *Microsoft Press*, (1997),pp. 42-43, 54-58.

"Microsoft Word 2000", Screenshots,(1999),1-5.

Beauchemin, Dave, "Using InfoPath to Create Smart Forms", Retrieved from the Internet at http://www.microsoft.com/office/infopath/prodinfo/using.mspx on Jan. 21, 2007,(Mar. 27, 2003).

Begun, Andrew, et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Borland, Russo, "Running Microsoft Word 97", 314-315, 338, 361-362, 390, and 714-719.

Brabrand, et al., "Power Forms Declarative Client-side Form Field Validation", (2002),1-20.

Dubinko, Micah, "XForms and Microsoft InfoPath", Retrieved from the Internet at http://www.xml.com/lpt/a/1311 on Jan. 21, 2007,(Oct. 29, 2003).

Hoffman, Michael, "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Lehtonen, Miro, et al., "A Dynamic User Interface for Document Assembly", Department of Computer Science, University of Helsinki,(Nov. 2002).

Nelson, Joe, "Client-side Form Validation Using JavaScript", *Developer Advisory*, (Sep. 21, 2001).

Raman, T. V., et al., "XForms 1.0", (Dec. 2001),Section 1-12.2.3 & Appendices A-G.

Rees, Michael J., "Evolving the Browser Towards a Standard User Interface Architecture", School of Information Technology, Bond University, Australia,(2001).

Singh, Darshan, "Microsoft InfoPath 2003 by Example", Retrieved from the Internet at http://www.perfectxml.com/InfoPath.asp on Jan. 21, 2007,(Apr. 20, 2003).

Udell, Jon, "InfoPath and XForms", Retrieved from the Internet at http://weblog.infoworld.com/udell/2003/02/26.html,(Feb. 26, 2003).

Cybook, Inc.: "Copying the Search Form to Services-based Web Sites" INternet Article, (online) Jul. 26, 2004.

Macromedia, Inc.: "Dreamweaver Technote, Changes in copying and pasting in Dreamweaver 4" Internet Article (online).

Rado, Dave: "How to create a template that makes it easy for users to "fill in the blanks", without doing any programming" Microsoft Word MVP FAQ Site, (online) Apr. 30, 2004.

Anat, Eyal et al., "Integrating and Customizing Hereroogeneous E-Commerce Applications", The VLDB Journal—The International Journal on Very Large Data Bases, vol. 10, Issue 1,(Aug. 2001),16-38.

Adams, Susie et al., "BizTalk Unleashed", Sams publishing, 2002, first printing Mar. 2001,1-2, 31-138.

Vasters, Clemens F., "BizTalk Server 2000 a Beginners Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation", http://www2002.org/CDROM/refereed/321, Printed on May 18, 2007,(May 2002),25 pages.

Cover, XML Forms Architecture, retrieved at <<http://xml.coverpages.org/xfa.html>> on Aug. 17, 2006, Coverpages, Jun. 16,1999.

Raggett, "HTML Tables", retrieved on Aug. 6, 2006, at <<http:www://is-edu.hcmuns.edu.vr/WebLib/books/Web/Tel/html3-tables.htrnl>, W3C Internet Draft, Jul. 7, 1995, pp. 1-12.

Altova, et al., "User and Reference Manual Version 4.4", www.xmlspy.com, (May 24, 2007),1-565.

"XForm 1.0", W3C,(Jul. 16, 2001),.

Grosso, et al., "XML Fragment Interchange", W3C,(Feb. 2001),1-28.

"Webopedia Computer Dictionary" retrieved on May 9, 2006, at http://www.pewebopedia.com/TERM/O/OLE.html>, Jupitermedia Corporation, 2006, pp. 7.

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Laura Acklen & Read Gilgen, "Using Corel Wordperfect 9", 251-284, 424-434, 583-586 (1998).

"A tour of Xmetal" O'Reilly XML.Com 'Online Jul. 14, 1999 XP002230081 retrieved from the internet: <URL:http:// www.xml.com/pub/a/SeyboldReport/ip0311025.html> retrieved on Feb. 5, 2003.

"Flexible Information Presentation with XML" 1998 the Institution of Electrical Engineers 6 pages.

Berg A., "Naming and Binding: Monikers" Inside OLE, 1995, Chapter 9, pp. 431-490.

"Designing Valid XML Views" ER 2002 LNCS 2503 2002 Springer-Verlag Berlin Heidelberg 2002 pp. 463-477.

Efficient Management of Multiversion Documents by Object Referencing Proceedings of the 27th VLDB Conference 2001 pp. 291-300.

"Efficient schemes for managing mulitversion XML documents" VLDB Journal (2002) pp. 332-352.

"XML Document Versioning" SIGMOD Record vol. 30 No. 3 Spet 2001 pp. 46-53.

"Generic Validation of Structural Content with Parametric Modules" ICFP '01 Sep. 3-5, 2001 Copyright 2001 ACM 1-58113-415-0/01/0009 pp. 98-109.

"Managing Complex Documents Over the WWW: A Case Study for XML" IEEE Transactions on Knowledge and Data Engineering vol. 11 No. 4 Jul./Aug. 1999. pp. 629-938.

Clapp D., "The NeXT Application Kit Part I: Non-Responsive Classes," the NeXT Bible 1990, Chapter 16, pp. 275-293.

Clark James—W3C Editor; "XSL Transformation (XSLT) Verison 1.0" Nov. 16 1999 W3C (MIT INRIA Kejo) pp. 1-156.

W3C Editor James Clark and Ste; "XML Path Language (XPath) Version 1.0" Nov. 16, 1999 W3C (MIT INRIA Kejo) pp. 1-49.

"XML Editors: Allegations of Functionality in search of reality" Internet 'Online!,1999 XP002230082 retrieved from the Internet <URL:http://www.ivritype.com/xml/>.

DiLascia et al., "Sweeper" Microsoft Interactive Developer, vol. 1, No. 1, 1996, 27 pages.

"Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.

"Mapping and Displaying Structural Transformations between XML and PDF" DocEng '02 Nov. 8-9, 2002 Copyright 2002 ACM 1-58113-597-7/02/0011 pp. 95-102.

Herzner et al., "CDAM—Compound Document Access and Management. An Object-Oriented Approach" Multimedia Systems Interaction and Applications, 1992, Chapter 3, pp. 17-36.

"Specifying Runtime Environments and Functionalities of Downloadable Components Under the Sandbox Mode"; International Symposium on Principles of Software Evolution; 2000; pp. 138-142.

"An Efficiently Updatable Index Scheme for Structured Documents" 1998 IEEE pp. 991-996.

"Immediate and Partial Validation Mechanism for the Conflict Resolution of Update Operations in XML Databases" WAIM 2002 LNCS 2419 2002 pp. 387-396 Springer-Veriag Berlin Heidelberg 2002.

KobayaShi et al., "An Update on BTRON-specification OS Development" IEEE 1991, pp. 132-140.

McCright J.S.; "New Tool Kit to Link Groove with Microsoft Sharepoint" eWeek Enterprise News & Reviews Ziff Davis Media Inc. Jul. 29, 2002.

Musgrave S; "Networking technology—impact and opportunities" Survey and Statistical Computing 1996. Proceedings of the Second ASC International Conference. Sep. 1996. pp. 369-78. London UK.

"SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

Object Management Group, XML Metadata Interchange (XMI) Specification Version 1.2 Jan. 2002.

"Delphi 5 Developer's Guide" Sams Publishing 1999 Chapter 31 Section: Data Streaming 6 pages.

Pike et al., "Plan 9 from Bell Labs" UKUUG, Summer 1990, 10 pages.
Pike et al., "The Use of Name Spaces in Plan 9," Operating Systems Review vol. 27, No. 2, Apr. 1993, pp. 72-76.
Prevelakis et al., "Sandboxing Applications"; Proceedings of the Freenix Track; 2001; pp. 119-126.
"Validating MPEG-21 Encapsulated Functional Metadata" IEEE 2002 pp. 209-212.
Staneck W., "Internal and External Media" Electronic Publishing Unleashed, 1995, Chapter 22, pp. 510-542.
"XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].
"An Efficient and Flexible Access Control Framework for Java Programs in Mobile Terminals"; 22nd International Conference on Distributed Computing Systems Workshops; 2002; pp. 777-782.
"XML: Not a Silver Bullet But a Great Pipe Wrench" Standardview vol. 6. No. 3 Sep. 1998 pp. 125-132.
"The Open Software Description Format" Online Aug. 13, 1997 retrieved from the Internet on Nov. 7, 2003: <http://www.w3.org/TR/NOTE-OSD> 11 pages.
"The Component Object Model" A Technical Overview Oct. 1994 Microsoft Corp. pp. 1-14.
"Managing and Querying Multi-Version XML Data with Update Logging" DocEng '02 Nov. 8-9, 2002 Copyright 2002 ACM 1-58113-594-7/02/0011 pp. 74-81.
Zdonik S., "Object Management System Concepts," ACM, 1984, pp. 13-19.
Leblond et al, "PC Magazine Guide to Quattro Pro for Windows", pp. 9-11, 42-61, Ziff-Davis Press, Copyright 1993 by the LeBlond Group.
Microsoft Visual Basic 5.0 Programmer's Guide 1997; pp. 578-579;Redmond WA 98052-6399.
Excel 97 for Busy People Published by Osborne/Mcgraw-Hill 1997 pp. 48-50.
"Microsoft Word 2000 Screenshots", (2000),11-17.
XMLSPY, "XmlSpy 2004 Enterprise Edition Manual", Altova,(May 17, 04),1-25, 220-225.
STYLUSSTUDIO, "StylusStudio: XPath Tools", 2004-2007, StylusStudio,1-14.
DODDS, "Toward an XPath API", xml.com,(May 7, 2001),1-3.
ALTOVA, "Altova Tools for XPath 1.0/2.0", Altova,1-12.
"Microsoft Word 2000 Screenshots", Word,(2000),1-17.
"Notice of Allowance", U.S. Appl. No. 10/404,312, (Jan. 12, 2009),12 pages.
"Final Office Action", U.S. Appl. No. 10/857,689, (Jan. 6, 2009),23 pages.
"Non Final Office Action", U.S. Appl. No. 10/977,198, (Feb. 2, 2009),15 pages.
"Non Final Office Action", U.S. Appl. No. 10/939,588, (Feb. 18, 2009),40 pages.
"Non Final Office Action", U.S. Appl. No. 10/976,451, (Feb. 23, 2009),39 pages.
"Non final Office Action", U.S. Appl. No. 11/234,767, (Feb. 26, 2009),37 pages.
"Notice of Allowance", U.S. Appl. No. 11/167,514, (Mar. 11, 2009),6 pages.
"Non Final Office Action", U.S. Appl. No. 10/942,528, (Mar. 6, 2009),31 pages.
"Foreign Office Action", Application Serial No. 2,412,611, (Feb. 9, 2009),6 pages.
"Foreign Office Action", Application Serial No. 200610003709.2, (Jan. 9, 2009),8 pages.
"Ep Office Action", Application U.S. Appl. No. 06111546.5 (Oct. 15, 2008),5 pages.
"Notice of Re-Examination", Application U.S. Appl. No. 01813138.7, (Mar. 11, 2009),27 pages.
"Notice of Allowance", U.S. Appl. No. 10/988,718, (Apr. 9, 2009).
"Final Office Action", U.S. Appl. No. 11/107,347, (Apr. 2, 2009),15 pages.
"Restriction Requirement", U.S. Appl. No. 11/227,550, (Apr. 2, 2009),8 pages.

"Non Final Office Action", U.S. Appl. No. 10/955,665, (Apr. 2, 2009),19 pages.
"Non Final Office Action", U.S. Appl. No. 10/988,720, 19 pages.
"Final Office Action", U.S. Appl. No. 11/203,818, (Apr. 14, 2009),31 pages.
"Final Office Action", U.S. Appl. No. 11/044,106, (Apr. 13, 2009),20 pages.
"Final Office Action", U.S. Appl. No. 11/226,044, (Apr. 20, 2009),24 pages.
"Final Office Action", U.S. Appl. No. 11/056,500, (Apr. 16, 2009),10 pages.
Hall, Richard S., "Agent-based Software Configuration and Development", http://www.doc.ic.ac.uk/~alw/edu/theses/hall-phd-0599.pdf on Jun. 8, 2009, Thesis of the University of Colorado,(May 1, 1999),182 pages.
"Final Office Action", U.S. Appl. No. 11/203,937, (May 7, 2009),13 pages.
"Non Final Office Action", U.S. Appl. No. 10/955,666, (May 7, 2009),28 pages.
"Non Final Office Action", U.S. Appl. No. 10/876,433, (Apr. 24, 2009),62 pages.
"Non Final Office Action", U.S. Appl. No. 10/916,692, (Apr. 30, 2009),14 pages.
"Non Final Office Action", U.S. Appl. No. 09/599,809, (May 13, 2009).
"Non Final Office Action", U.S. Appl. No. 11/295,178.
"Non Final Office Action", U.S. Appl. No. 10/990152.
"Final Office Action", U.S. Appl. No. 11/036,910, (Jun. 1, 2009),15 pages.
"Non Final Office Action", U.S. Appl. No. 10/857,689, (Jun. 11, 2009),25 pages.
"Non Final Office Action", U.S. Appl. No. 11/095254, (Jun. 8, 2009),21 pages.
"Final Office Action", U.S. Appl. No. 11/234,767, 24 pages.
Acklen, et al., "Using Corel Wordperfect 9", Que Corporation(1998),pp. 251-284, 424-434, 583-585.
"Foreign Office Action", Application Serial No. 2002-503702, Final Notice of Rejection,(Jun. 5, 2009),212 pages.
"Final Office Action", U.S. Appl. No. 10/976,451 (Jul. 2, 2009), 22 pages.
Reagan, Moore W., et al., "Collection-based persistent digital archives", U.S. Appl. No. 60/191,662, filed Mar. 23, 2000, 133.
"Non-Final Office Action", U.S. Appl. No. 11/227,550, (Aug. 3, 2009),10.
"Notice of Allowance", U.S. Appl. No. 11/203,937, (Aug. 3, 2009),7 pages.
"Non-Final Office Action", U.S. Appl. No. 11/234,767, (Aug. 12, 2009),24 Pages.
"Final Office Action", U.S. Appl. No. 10/977,198, (Aug. 19, 2009),15 pages.
"Non-Final Office Action", U.S. Appl. No. 10/939,588, (Aug. 27, 2009),28 pages.
"Final Office Action", U.S. Appl. No. 10/402,640, (Aug. 28, 2009),17 pages.
"Notice of Allowance", U.S. Appl. No. 11/203,937, Supplemental,(Sep. 15, 2009),2 pages.
"Final Office Action", U.S. Appl. No. 10/942,528, (Sep. 17, 2009),27 pages.
"Non-Final Office Action", U.S. Appl. No. 11/107,347, (Sep. 17, 2009),9 pages.
"Notice of Allowance", U.S. Appl. No. 10/988,720, (Sep. 17, 2009),18 pages.
"Non-Final Office Action", U.S. Appl. No. 11/044,106, (Sep. 24, 2009),17 pages.
"Foreign Office Action", Application Serial No. 200610051554.X, (Jul. 10, 2009),11 pages.
"Notice of Allowance", U.S. Appl. No. 11/203,937, (Aug. 31, 2009),2 pages.
"Non-Final Office Action", U.S. Appl. No. 11/567,149, (Sep. 8, 2009),5 pages.
"Final Office Action", U.S. Appl. No. 10/955,666, (Oct. 14, 2009),24 pages.

"Advisory Action", U.S. Appl. No. 10/942,528, (Oct. 26, 2009),3 pages.

"Non-Final Office Action", U.S. Appl. No. 11/557,931, (Oct. 20, 2009),27 pages.

"Non-Final Office Action", U.S. Appl. No. 10/976,451, (Oct. 29, 2009),14 pages.

"Notice of Allowance", U.S. Appl. No. 10/955,665, (Nov. 3, 2009),8 pages.

Dyck, Timothy "XML Spy Tops as XML Editor", eWeek, vol. 19, No, 47, (Nov. 25, 2002),3 pages.

Hwang, Kai et al., "Micro-Firewalls for Dynamic Network Security with Distributed Intrusion Detection", IEEE Int'l, Symposium on Network Computing and Applications, 2001,(2001),pp. 68-79.

Schmid, M et al., "Protecting Data from Malicious Software", 18th Annual Security Applications Conference,(2002),pp. 199-208.

Rapaport, L "Get More From SharePoint", Transform Magazine, vol. 11, No. 3(Mar. 2002),2 pages.

"Whitehill Composer Software product", Retrieved from www.xml.com/pub/p/221 on Apr. 8, 2004, Whitehill Technologies, Inc.,(Apr. 8, 2004),2 pages.

Peterson, B "Unix Variants", Unix Review, vol. 10, No. 4(Apr. 1992),pp. 29-31.

Clark, P "From Small Beginnings", *Knowledge Management*, (Nov. 2001),pp. 28-30.

Komatsu, N. et al., "A Proposal on Digital Watermark in Document Image Communication and its Applications to Realizing a Signature", Electronics and Communication in Japan, Part I: Communications, vol. 73, No. 5,(May 1990),pp. 22-33.

Noore, A "A Secure Conditional Access System using Digital Signature and Encryption", International Conference on Consumer Electronics,(Jun. 2003),pp. 220-221.

"Netscape Communicator 4.61 for OS/2 Warp", Netscape Communication Corporation, Software 1999, The Whole software release & Netscape—Version 4.61 {en}—010615, Netscape Screenshot(Oct. 2, 2002),1 page.

Dayton, Linnea et al., "Photo Shop 5/5.5 WOW! Book,", 2000, Peachpit Press,(2000),pp. 8-17.

Varlamis, Iraklis et al., "Bridging XML—Schema and relational database. A System for generating and manipulating relational databases using valid XML documents", DocEng 01, ACM 1-58113-432-0/01/0011,(Nov. 9-10, 2001),pp. 105-114.

Haukeland, Jan-Henrick "Tsbiff-tildeslash biff—version 1.2.1", http://web.archive.org/web/19990912001527/http://www.tildeslash.com/tsbiff/., (Jun. 1999),pp. 1-2.

Bray, Tim et al., "Extensible Markup Language (XML)", Retrieved from: <http://www.textuality.com/sgml-erb/WD-xml.html>, second named inventor Jean Paoli, third named inventor C.M. Sperberg-McQueen,(Feb. 10, 1998),37 Pages.

Bradley, Neil "The XML Companion, Third Edition", Retrieved from: <http://produest.safaribooksonline.com0201770598>, Published by Addison Wesley Professional,(Dec. 12, 2001),pp. 1-18.

Klarlund, Nils "DSD: A Schema Language for XML", *ACM, FSMP* Portland Oregon, (2000),101-111.

Watt, Andrew "Microsoft Office Infopath 2003 Kick Start", (*Published by Sams*) Print ISBN-10:0-672-32623-X, (Mar. 24, 2004),1-57.

Hu, et al., "A Programmable Editor for Developing Structured Documents based on Bidirectional Transformations", ACM,(Aug. 2004),178-179.

Kay, Michael "XSL Transformations (XSLT) Version 2.0", http://www.w3.org/TR/2005/WD-xslt20-20050404, (Apr. 2005),1-374.

"HP Blade Server BH Series Operating System Guide", Hewlett-Packard,(Jul. 2002),69.

"Validation with MSXML and XML Schema", Windows Developer Magazine, (Jan. 1, 2002),5 pages.

"Architecture for a Dynamic Information Area Control", IBM Technical Disclosure Bulletin, IBM Corp, NY, US vol. 37, No. 10, Jan. 10, 1994,pp. 245-246.

"Copying the Search Form to Custom Pages In Windows SharePoint Services-based Web Sites", *CyBook, Inc.*, Jul. 26, 2004 Internet Article,(2004),1 page.

"Excel Developer Tip: Determining the Data Type of a Cell", Retrieved from <http://iwalk.com/ss/excel/tips/tip62.htm>, (May 13, 1998),1 page.

"Final Office Action", U.S. Appl. No. 11/227,550, (Jan. 19, 2010),12 pages.

"Final Office Action", U.S. Appl. No. 11/234,767, (Jan. 26, 2010),23 pages.

"Final Office Action", U.S. Appl. No. 11/295,178, (Dec. 24, 2009),38 pages.

"Foreign Notice of Allowance" *Mexican Application* No. PA/a/2005/012067 (Nov. 13, 2009),1 page.

"Foreign Office Action", U.S. Appl. No. 200610051544.X (Dec. 4, 2009),9 pages.

"Netscape Communicator 4.61 for OS/2 Warp", Netscape Communication Corporation, Software 1999, The Whole software release & Netscape—Version 4.61 {en}—010615, Netscape Screenshot,(Oct. 2, 2002),1 page.

"Non-Final Office Action", U.S. Appl. No. 10/402,640, (Dec. 30, 2009),16 pages.

"Non-Final Office Action", U.S. Appl. No. 11/218,149 (Jan. 14, 2010),15 Pages.

"Non-Final Office Action", U.S. Appl. No. 12/021,894 (Dec. 31, 2009),10 pages.

"Notice of Allowance", U.S. Appl. No. 10/990,152, (Dec. 21, 2009),6 pages.

"Notice of Allowance", U.S. Appl. No. 11/072,087, (Feb. 23, 2010),4 pages.

"Notice of Allowance", U.S. Appl. No. 11/872,703, (Jan. 27, 2010),19 pages.

"OMG XML Metadata Interchange (XMI) Specification" Retrieved from: <http://wvvw.omg.org/cgi-bin/doc?formal/02-01-01.pdf> on Dec. 2, 2009 Version 1.2,(Jan. 2002),268 pages.

"SmartUpdate Developer's Guide" Retrieved from http://developernetscapte.com:80/docs/manuals/communicator/jarman/index.htm on Dec. 8, 2000, Netscape Communications Corp,(Mar. 11, 1999),83 pages.

"Stack Algorithm for Extracting Subtree from Serialized Tree" *IBM Technical Disclosure Bulletin*, TDB-ACC-NO; NN94033, (Mar. 1, 1994),2 pages.

"Store and Organize Related Project Files in a Binder", Getting results with Microsoft Office,(1990),pp. 109-112.

"Streamlining Content Creation", Ixia Soft Jun. 6, 2002,pp. 1-16.

"Supplemental Notice of Allowance" U.S. Appl. No. 10/955,665, (Dec. 30, 2009),2 pages.

"Supplemental Notice of Allowance" U.S. Appl. No. 10/955,665, (Feb. 4, 2010),2 pages.

"Supplemental Notice of Allowance", U.S. Appl. No. 10/955,665 (Nov. 27, 2009),2 pages.

"Validation with MSXML and XML Schema", Windows Developer Magazine (Jan. 1, 2002),5 pages.

"Whitehill Composer Software product" Retrieved from www.xml.com/pub/p/221 on Apr. 8, 2004 Whitehill Technologies, Inc.,(Apr. 8, 2004),2 pages.

"XML Forms Architecture (XFA)" Retrieved from http://xml.coverpages.org/xfa.html on Aug. 17, 2006, Cover Pages Technology Reports(Jun. 6, 1999),p. 1.

Alschuler, Liora "A Tour of XMetal", Retrieved from: <http://www.xml.com/pub/a/SeyboldReport/ip031102.html> on Feb. 5, 2003, XML.com, Online! XPOO2230081,(Jul. 14, 1999),3 pages.

Altova, "XML Spy 4.0 Manual", 1998-2001 *Altova Inc. & Altova GmbH*, (Sep. 10, 2001),pp. 1-90, 343-362.

Altova, et al., "XML Spy, XML Integrated Development Environments", Altova Inc.,(2002),pp. 1-18.

Au, Irene et al., "Netscape Communicator's Collapsible Toolbars", CHI 98, Human Factors in Computing Systems, Conference Proceedings, LA, CA,(Apr. 18-23, 1998),pp. 81-86.

Barker, et al., "Creating In-Line Objects Within an Integrated Editing Environment", IBM Technical Disclosure Bulletin, vol. 27, No. 5,(Oct. 1984),p. 2962.

Battle, Steven A., et al., "Flexible Information Presentation with XML", *The Institution of Electrical Engineers*, (1998),6 pages.

Ben-Natan, Ron et al., "Internet Platform for Creating and Supporting Communities" U.S. Appl. No. 60/203,081, filed May 9, 2000,31 pages.
Berg, A "Naming and Binding: Monikers" *Inside OLE, Chapter 9, Harmony.Books*, (1995),pp. 431-490.
Brogden, William "Arbortext Adept 8 Editor Review", Retrieved from: <www.xml.com/pub/a/1999/09/adept/AdeptRvw.htm> on 02/05/03, O'Reilly XML.Com, Online!,(Sep. 22, 1999),4 pages.
Chen, Ya B., et al., "Designing Valid XML Views", *S. Spaccapietra, S.T. March and Y. Kambayashi (Eds.): ER 2002, LNCS 2503*, Copyright: Springer-Verlag Berlin Heidelberg 2002,(2002),pp. 463-477.
Chen, Yi et al., "XKvalidator: A Constraint Validator for XML" *CIKM '02* Nov. 4-9, 2002, McLean, VA, USA, Copyright 2002, ACM, ISBN 1-58113-492-4/020011,(Nov. 4-9, 2002),pp. 446-452.
Chien, et al., "Efficient Management of Multiversion Documents by Object Referencing", Proceedings of the 27th VLDB Conference,(2001),pp. 291-300.
Chien, Shu-Yao et al., "Efficient Schemes for Managing Multiversion XML Documents", *The VLDB Journal 2002*, (Dec. 19, 2002),pp. 332-353.
Chien, Shu-Yao et al., "Storing and Querying Multiversion XML Documents using Durable Node Numbers", IEEE,(2002),pp. 232-241.
Chien, Shu-Yoa et al., "XML Document Versioning", SIGMOD Record, vol. 30, No. 3(Sep. 2001),pp. 46-53.
Chuang, Tyng-Ruey "Generic Validation of Structural Content with Parametric Modules" *ICFP 2001 International Conference on Functional Programming*, vol. 36, No. 10, Available at <http://citeseerx.ist.psu.edu/viewdoc/download?doi=10.1.1.7.6412&rep=repl &type=pdf>,(Sep. 3, 2001),12 pages.
Ciancarini, Paolo A., et al., "Managing Complex Documents Over the WWW: A Case Study for XML" *Transactions on Knowledge and Data Engineering*, vol. 11, No. 4, Available at <http://citeseerx.ist.psu.edu/viewdoc/download?doi=10.1.1.18.1679&rep=rep1&type= pdf>,(Apr. 1999),pp. 1-14.
Clapp, D "The NeXT Application Kit Part 1: Non-Responsive Classes", *The NeXT Bible Chapter 16*, (1990),pp. 275-293.
Clark, James "XSL Transformation (XSLT), Version 1.0" Retrieved from: <www.w3.org/TR/1999/REC-xsIt19991116> on Oct. 26, 2009, WC3,(Nov. 16, 1999),57 pages.
Clark, James et al., "XML Path Language (XPath)", Retrieved from: <www.w3.org/TR/1999/RCE-xpath-19991116> on Oct. 26, 2009, Version 1.0,(Nov. 16, 1999),37 pages.
Clark, Peter "From Small Beginnings", *Knowledge Management*, (Nov. 2001),pp. 28-30.
Cover, Robin "XML Forms Architecture (XFA)" Cover Pages. Retrieved from "http://xml.coverpages.org/xfa.html" on Aug. 17, 2006, (Apr. 19, 2000),4 pages.
Davidow, Ari "XML Editors: Allegations of Functionality in Search of Reality", Retrieved from: <http://www.ivritype.com/xml/> on Feb. 9, 2009, SP002230082,(Oct. 12, 1999),16 pages.
Dayton, Linnea et al., "Photo Shop 5/5.5 WOW! Book" 2000, *Peachpit Press*, (2000),pp. 8-17.
Dilascia, Paul et al., "Sweeper" *Microsoft interactive developer*, vol. 1., No. 1 (1996),pp. 16-52.
Dorward, Sean et al., "Unix Variants" *Unix Review*, vol. 10, No. 4, (Apr. 1992),pp. 29-31.
Dyck, Timothy "XML Spy Tops as XML Editor" *eWeek*, vol. 19, No. 47,, (Nov. 25, 2002),3 pages.
Halberg, et al., "Using Microsoft Excel 97", Que Corporation(1997),pp. 1-9, 18-25, 85-89, 98-101, 106-113, 124-127, 144-147, 190-201, 209-210, 213-227, 581-590, 632-633, 650-655, 712-714.
Han, Richard et al., "Websplitter: A Unified XML Framework for Multi-Device Collaborative Web Browsing" *ACM Conference on Computer Supported Cooperative Work*, (2000),10 pages.
Hardy, Matthew R., et al., "Mapping and Displaying Structural Transformations between XML and PDF", *Proceedings of the 2002 ACM symposium on Document engineering*, (Nov. 8-9, 2002),pp. 95-102.
Haukeland, Jan-Henrick "Tsbiff-tildeslash biff—Version 1.2.1", http://web.archive.org/web/19990912001527/http://www.tildeslash.com/tsbiff/.,(Jun. 1999),2 pages.

Herzner, Wolfgang et al., "CDAM-Compound Document Access and Management. An Object-Oriented Approach" *ACM SIGOIS Bulletin*, vol. 12 , Issue 1, MultiMedia Systems Interaction and Applications, Chapter 3(Jul. 1991),18 pages.
Honkala, Mikko et al., "Multimodal Interaction with XForms" ICWE '06, (2006),pp. 201-208.
Hwang, Kai et al., "Micro-Firewalls for Dynamic Network Security with Distributed Intrusion Detection" *IEEE International Symposium on Network Computing and Applications 2001*, (2001),pp. 68-79.
Kaiya, Haruniko et al., "Specifying Runtime Environments and Functionalities of Downloadable Components under the Sandbox Model" *International Symposium on Principles of Software Evolution 2000*, (2000),pp. 138-142.
Kanemoto, Hirotaka et al., "An Efficiently Updatable Index Scheme for Structured Documents", *DEXA'98*, (1998),pp. 991-996.
Kim, Sang-Kyun et al., "Immediate and Partial Validation Mechanism for the Conflict Resolution of Update Operations in XML Databases" *WAIM 2002, LNCS 2419 2002 Springer-Verlag* Berlin Heidelberg 2002 ,pp. 387-396.
Kobayashi, M. et al., "An Update on BTRON-specification OS Development", *Proceedings of the 8thTRON Project Symposium, 1991*, 0/8186-2475-2/91,(1991),pp. 132-140.
Komatsu, Naohisa et al., "A Proposal on Digital Watermark in Document Image Communication and It's Application to Realizing a Signature" *Electronics and Communication in Japan, Part I: Communications*, vol. 73, No. 5, (May 1990),pp. 22-33.
Kutay, Ali et al., "Methods and Systems for Accessing, Organizing, Presenting and Viewing Data", U.S. Appl. No. 60/209.713. Kutay et al., Filed Jun. 5. 2000,345 pages.
Leblond, et al., "PC Magazine Guide to Quattro Pro for Windows", Ziff-Davis Press,(1993),pp. 9-11, 42-61.
Mansfield, Ron "Excel 97 for Busy People", Osborne/McGraw-Hill,,(Jan. 27, 1997),pp. 48-50.
McCright, John S., "New Tool Kit to Link Groove with Microsoft SharePoint", Retrieved from: <http://www.eweek.com/c/a/Enterprise-Applications/New-Tool-Kit-to-Link-Groove-With-Microsoft-SharePoint/> on Dec. 28, 2009, (Jul. 29, 2002),3 pages.
Musgrave, S "Networking Technology—Impact and Opportunities" *Survey and Statistical Computing 1996 Proceedings of the Second ASC International Conference*, London, UK., (Sep. 1996),pp. 369-378.
Noore, Afzel "A Secure Conditional Access System using Digital Signature and Encryption" *International Conference on Consumer Electronics*, (Jun. 2003),pp. 220-221.
Pike, Rob et al., "Plan 9 From Bell Labs", AT&T Bell Laboratories, UKUUG, Summer 1990,(1990),10 pages.
Pike, Rob et al., "The Use of Name Spaces in Plan 9", *Operating Systems Review*, vol. 27, No. 2, (Apr. 1993),pp. 72-76.
Prevelakis, Vassilis et al., "Sandboxing Applications" *FREENIX Track: 2001 USENIX Annual Technical Conference*, (2001),pp. 119-126.
Rado, Dave "How to create a template that makes it easy for users to 'fill in the blanks' without doing any programming " Retrieved from http://word.mvps.org/FAQs/Customization/FillinTheBlanks.htm (Apr. 2004),pp. 1-2.
Raggett, "HTML Tables" Retrieved from: <http:www.//is-edu.homuns.edu.vn/WebUb/booksM/eb/Tel/htm13-tables.html> on Aug. 6, 2006, W3C Internet Draft,(Jul. 7, 1995),pp. 1-12.
Rapaport, Lowell "Get More From SharePoint", *Transform Magazine*, vol. 11 No. 3 (Mar. 2002),2 pages.
Rogge, Boris et al., "Validating MPEG-21 Encapsulated Functional Metadata", IEEE 2002, ISBN 0/7803-7304-9/02,(2002),pp. 209-212.
Schmid, Mathew et al., "Protecting Data from Malicious Software", *18th Annual Security Applications Conference*, (2002),pp. 199-208.
Staneck, W "Internal and External Media", Electronic Publishing Unleashed, Chapter 22(1995),pp. 510-542.
Sun, Q et al., "A Robust and Secure Media Signature Scheme for JPEG Images", Proceeding of 2002 IEEE Workshop on Multimedia Signal Processing,(Dec. 2002),pp. 296-299.
Sutanthavibul, Supoj et al., "XFIG Version 3.2 Patchlevel 2 (Jul. 2, 1998) Users Manual (Edition 1.0)" Retrieved from: <www.ice.mtu.

edu/online_docs/sfig332/> on Jan. 28, 2003, Internet Document XP002229137,(Jul. 2, 1998),60 pages.

Tomimori, Hiroyuki et al., "An Efficient and Flexible Access Control Framework for Java Programs in Mobile Terminals", Proceeding of 22nd Int'l Conference on Distributed Computing Systems Workshops,(2002),pp. 777-782.

Trupin, J "The Visual Programmer", Microsoft Systems Journal,(Apr. 1996),pp. 103-105.

Usdin, Tommie et al., "XML: Not a Silver Bullet, But a Great Pipe Wrench", *Standard View* vol. 6, No. 3, (Sep. 2, 1998),pp. 125-132.

Varlamis, Iraklis et al., "Bridging XML-Schema and relational database. A System for generating and manipulating relational databases using valid XML documents", DocEng 01, ACM 1-58113-432-0/01/0011,(Nov. 9-10, 2001),pp. 105-114.

Williams, Sara et al., "The Component Object Model: A Technical Overview", Microsoft Corp,(Oct. 1994),pp. 1-14.

Wong, Raymond K., et al., "Managing and Querying Multi-Version XML Data with Update Logging", *DocEnci '02* (Nov. 8-9, 2002),8 pages.

Zdonik, S "Object Management System Concepts", ACM,(1984),pp. 13-19.

"Final Office Action", U.S. Appl. No. 11/557,931, (Feb. 26, 2010),8 pages.

"Non-Final Office Action", U.S. Appl. No. 11/227,550, (Mar. 10, 2010),12 pages.

"Notice of Allowance", U.S. Appl. No. 10/939,588 (Mar. 10, 2010),10 pages.

"Supplemental Notice of Allowance", U.S. Appl. No. 10/955,665, (Mar. 5, 2010),2 pages.

"Notice of Allowance", U.S. Appl. No. 11/044,106, (Mar. 15, 2010),7 pages.

Fukuhara, Yasuji "Clarisworks, Introduction to Business Document Construction, No. 4, Estimate", *NIKKEI MAC*, No. 14; Japan, (May 17, 1994),18 pages.

Iwantani, Kaori et al., "Perfect Manual of Clarisworks 4.0 for Macintosh", *1st Edition*, Japan, (Jul. 22, 1997),33 pages.

Matsushita, Noriko "Step-up Training of Clarisworks (Tabulation), Successful Use of Spreadsheet and Tabulation", *Mac People*, vol. 4, No. 19, (Oct. 1, 1998),5 pages.

Senda, Akihiro "Word 2000, Conservative—Looking but 'Attentive' New Function", *NIKKEI PC 21*, vol. 4, No. 8; Japan, (Aug. 1, 1999),4 pages.

"Final Office Action", U.S. Appl. No. 11/107,347, (Mar. 22, 2010), 11 pages.

"Non-Final Office Action", U.S. Appl. No. 10/916,692, (Apr. 5, 2010), 6 pages.

"Non-Final Office Action", U.S. Appl. No. 10/976,451, (Apr. 9, 2010), 11 pages.

"Supplemental Notice of Allowance", U.S. Appl. No. 11/072,087, (Apr. 19, 2010), 2 pages.

"Supplemental Notice of Allowance", U.S. Appl. No. 10/990,152, (Apr. 19, 2010), 2 pages.

"Non-Final Office Action", U.S. Appl. No. 10/402,640, (Apr. 30, 2010),4 pages.

"Notice of Allowance", U.S. Appl. No. 11/557,931, (May 5, 2010),7 pages.

"Final Office Action", U.S. Appl. No. 10/916,692 Nov. 16, 2009, 10 pages.

"Final Office Action", U.S. Appl. No. 11/218,149 Nov. 16, 2009, 18 pages.

"Final Office Action", U.S. Appl. No. 11/072,087 Nov. 16, 2009, 9 pages.

"Foreign Office 5 pp. Action", Mexican Patent Application No. PA/a/2006/002493 Sep. 14, 2009, 5 pages.

"Non-Final Office Action", U.S. Appl. No. 11/036,910 Nov. 13, 2009, 9 pages.

"Notice of Allowance", U.S. Appl. No. 11/056,500 Dec. 2, 2009, 17 pages.

"Notice of Allowance", U.S. Appl. No. 11/095,254 Nov. 18, 2009, 8 pages.

"Notice of Allowance", U.S. Appl. No. 10/942,528 Dec. 3, 2009, 8 pages.

Van Hoff, Arthur et al., "The Open Software Description Format", Retrieved from: <www.w3.org/TR/NOTE-OSD> on May 18, 2009 Aug. 13, 1997, 10 pages.

"Final Office Action", U.S. Appl. No. 10/976,451, (Apr. 6, 2011),10 pages.

"Final Office Action", U.S. Appl. No. 11/234,767, (Mar. 10, 2011),28 pages.

"Mott Porous Metal. The Most Reliable Means of Restricting Gas Flow", *Mott Corporation Webpage*, retrieved from <<http://www.mottcorp.com/industry/oem/oem_flowres.htm>> on Aug. 23, 2004, 4 pages.

"Non Final Office Action", U.S. Appl. No. 11/567,140, (Feb. 18, 2011),8 pages.

"Non-Final Office Action", U.S. Appl. No. 11/927,296, (Mar. 4, 2011),19 pages.

"Notice of Allowance", U.S. Appl. No. 11/295,178, (Mar. 22, 2011),20 pages.

"Supplemental Notice of Allowance", U.S. Appl. No. 11/218,149, (Apr. 5, 2011),2 pages.

"Supplemental Notice of Allowance", U.S. Appl. No. 11/931,730, (Mar. 2, 2011),2 pages.

Prosise, Jeff "Programming Microsoft Net", retrieved from: <http://academic.safaribooksonline.com/print?xmlid=0/7356-1376-1/IDAVO3T> on Mar. 3, 2011, Microsoft Press,(May 15, 2002),24 pages.

Reilly, Douglas J., "Programming Microsoft Web Forms", retrieved from: <http://academic.safaribooksonline.com/print?xmlid=0735621799/systemdotwebdotuidotweb> on Mar. 3, 2011, Microsoft Press,(Nov. 2, 2005),52 pages.

"Final Office Action", U.S. Appl. No. 10/402,640, (Sep. 10, 2007),16 pages.

"Final Office Action", U.S. Appl. No. 10/976,451, (Jul. 27, 2010),12 pages.

"Final Office Action", U.S. Appl. No. 11/012,472, (Mar. 23, 2010),10 pages.

"Final Office Action", U.S. Appl. No. 11/295,178, (Jul. 30, 2010),43 pages.

"Foreign Office Action", Chinese Application No. 200610051554.X, (Jun. 25, 2010),10 pages.

"Issue Notification", U.S. Appl. No. 10/955,087, (Mar. 18, 2009),1 page.

"Issue Notification", U.S. Appl. No. 11/095,254, (Feb. 10, 2010),1 page.

"Issue Notification", U.S. Appl. No. 11/276,585, (Jan. 21, 2009),1 page.

"Netscape Window", *Netscape Screenshot*, (Oct. 2, 2002),1 page.

"Non Final Office Action", U.S. Appl. No. 10/402,640, (Oct. 6, 2006),15 pages.

"Non Final Office Action", U.S. Appl. No. 10/402,640, (Feb. 12, 2008),16 pages.

"Non Final Office Action", U.S. Appl. No. 10/402,640, (Apr. 25, 2007),16 pages.

"Non Final Office Action", U.S. Appl. No. 10/402,640, (Sep. 8, 2008),16 pages.

"Non-Final Office Action", U.S. Appl. No. 10/854,961, (Nov. 15, 2006),21 pages.

"Non-Final Office Action", U.S. Appl. No. 11/012,472, (Oct. 6, 2009),8 pages.

"Non-Final Office Action", U.S. Appl. No. 11/012,472, (Jul. 1, 2010),9 pages.

"Notice of Allowance", U.S. Appl. No. 10/854,961, (Jun. 14, 2007),12 pages.

"Restriction Requirement", U.S. Appl. No. 10/402,640, (Aug. 29, 2006),5 pages.

"Restriction Requirement", U.S. Appl. No. 11/012,472, (Jun. 9, 2009),7 pages.

"About Microsoft Word", Microsoft Word 2000, published 1983-1999, and Microsoft Excel 2000 (see Screen Shot "About Microsoft Excel") Published 1988-1999,(Oct. 21, 2005), 3 pages.

"Advisory Action", U.S. Appl. No. 10/898,657, (Mar. 25, 2008), 3 pages.

"Copying the Search Form to Services-based Web Sites", *Cybook, Inc., the whole document*, (Jul. 26, 2004), 1 page.

"Final Office Action", U.S. Appl. No. 09/599,086, (Mar. 6, 2008), 47 pages.
"Final Office Action", U.S. Appl. No. 09/599,086, (May 10, 2007), 41 pages.
"Final Office Action", U.S. Appl. No. 09/599,086, (May 25, 2004), 23 pages.
"Final Office Action", U.S. Appl. No. 09/599,086, (Jul. 5, 2006), 34 pages.
"Final Office Action", U.S. Appl. No. 09/599,086, (Aug. 8, 2005), 27 pages.
"Final Office Action", U.S. Appl. No. 09/599,299, (Apr. 20, 2004), 23 pages.
"Final Office Action", U.S. Appl. No. 09/599,812, (Aug. 12, 2003), 38 pages.
"Final Office Action", U.S. Appl. No. 10/178,291, (Dec. 19, 2005), 21 pages.
"Final Office Action", U.S. Appl. No. 10/723,188, (Jan. 9, 2009), 20 pages.
"Final Office Action", U.S. Appl. No. 10/723,863, (Sep. 19, 2007), 34 Pages.
"Final Office Action", U.S. Appl. No. 10/846,428, (Mar. 3, 2008), 23 pages.
"Final Office Action", U.S. Appl. No. 10/897,647, (Mar. 6, 2008), 25 pages.
"Final Office Action", U.S. Appl. No. 10/897,647, (Jul. 14, 2009), 36 pages.
"Final Office Action", U.S. Appl. No. 10/898,656, (Nov. 15, 2007), 16 pages.
"Final Office Action", U.S. Appl. No. 10/898,657, (Jan. 3, 2008), 21 pages.
"Foreign Decision of Grant", Russian Application No. 2006103267, (Aug. 13, 2010), 18 pages.
"Foreign Decision of Grant", Russian Application No. 2006105526, (Nov. 8, 2010), 16 pages.
"Foreign Office Action", Canadian Application No. 2408313, (Oct. 26, 2010), 5 pages.
"Foreign Office Action", Canadian Application No. 2412611, (Oct. 26, 2010), 2 pages.
"Foreign Office Action", European Patent Application No. 01939034.3,. (Nov. 5, 2007), 3 pages.
"Foreign Office Action", Russian Application No. 2006105526, (Aug. 24, 2010),5 pages.
"Manual of Patent Office Practice", *Computer-Implemented Inventions, Chapter. 16.09.02, Data Structures*, (Oct. 2010), 3 pages.
"Microsoft Computer Dictionary 5th Edition", *Entry for "Stack," Microsoft Press*, ISBN 0-7356-1495-4, (May 1, 2002), p. 495.
"Non Final Office Action", U.S. Appl. No. 09/599,086, (Jan. 30, 2006), 33 pages.
"Non Final Office Action", U.S. Appl. No. 09/599,086, (Oct. 28, 2003), 21 pages.
"Non Final Office Action", U.S. Appl. No. 09/599,086, (Oct. 31, 2007), 48 pages.
"Non Final Office Action", U.S. Appl. No. 09/599,086, (Nov. 13, 2006), 33 pages.
"Non Final Office Action", U.S. Appl. No. 09/599,086, (Nov. 14, 2008), 55 pages.
"Non Final Office Action", U.S. Appl. No. 09/599,086, (Mar. 3, 2005), 25 pages.
"Non Final Office Action", U.S. Appl. No. 10/178,291, (Nov. 26, 2004), 21 pages.
"Non Final Office Action", U.S. Appl. No. 10/178,291, (Apr. 29, 2004), 14 pages.
"Non Final Office Action", U.S. Appl. No. 10/178,291, (Jun. 27, 2005), 22 pages.
"Non Final Office Action", U.S. Appl. No. 10/897,647, (Nov. 14, 2008), 28 pages.
"Non Final Office Action", U.S. Appl. No. 10/897,647, (Sep. 6, 2007), 21 pages.
"Non Final Office Action", U.S. Appl. No. 10/898,656, (Apr. 18, 2008), 17 pages.
"Non Final Office Action", U.S. Appl. No. 10/898,656, (Jul. 13, 2007), 13 pages.
"Non Final Office Action", U.S. Appl. No. 10/898,657, (Jul. 18, 2007), 18 pages.
"Non Final Office Action", U.S. Appl. No. 10/898,657, (Sep. 8, 2008), 24 pages.
"Non-Final Office Action", U.S. Appl. No. 09/599,299, (Oct. 28, 2003), 32 pages.
"Non-Final Office Action", U.S. Appl. No. 09/599,299, (Aug. 12, 2004), 12 pages.
"Non-Final Office Action", U.S. Appl. No. 09/599,812, (Feb. 27, 2003), 20 pages.
"Non-Final Office Action", U.S. Appl. No. 09/599,812, (Feb. 5, 2004), 35 pages.
"Non-Final Office Action", U.S. Appl. No. 10/723,863, (Feb. 8, 2007), 30 Pages.
"Non-Final Office Action", U.S. Appl. No. 10/723,863, (Aug. 23, 2006), 16 Pages.
"Non-Final Office Action", U.S. Appl. No. 10/723,863, (Nov. 6, 2007), 7 Pages.
"Non-Final Office Action", U.S. Appl. No. 10/846,428, (Oct. 15, 2008), 23 pages.
"Non-Final Office Action", U.S. Appl. No. 10/846,428, (Jul. 19, 2007), 19 pages.
"Non-Final Office Action", U.S. Appl. No. 10/976,451, (Nov. 10, 2010), 9 pages.
"Non-Final Office Action", U.S. Appl. No. 11/218,149, (Sep. 20, 2010), 15 pages.
"Non-Final Office Action", U.S. Appl. No. 11/234,767, (Nov. 26, 2010), 28 pages.
"Non-Final Office Action", U.S. Appl. No. 12/061,613, (Sep. 28, 2010), 9 pages.
"Notice of Allowance", U.S. Appl. No. 09/599,086, (Aug. 17, 2009), 59 pages.
"Notice of Allowance", U.S. Appl. No. 09/599,299, (Nov. 30, 2004), 7 pages.
"Notice of Allowance", U.S. Appl. No. 09/599,812, (Aug. 3, 2004), 12 pages.
"Notice of Allowance", U.S. Appl. No. 10/178,291, (Feb. 6, 2006), 7 pages.
"Notice of Allowance", U.S. Appl. No. 10/723,863, (Jun. 30, 2008), 9 Pages.
"Notice of Allowance", U.S. Appl. No. 10/846,428, (Apr. 29, 2009), 10 pages.
"Notice of Allowance", U.S. Appl. No. 10/897,647, (Jan. 19, 2010), 13 pages.
"Notice of Allowance", U.S. Appl. No. 10/898,656, (Jan. 2, 2009), 9 pages.
"Notice of Allowance", U.S. Appl. No. 10/898,657, (Jun. 11, 2009), 20 pages.
"Notice of Allowance", U.S. Appl. No. 11/036,910, (Dec. 7, 2010), 7 pages.
"Notice of Allowance", U.S. Appl. No. 12/021,894, (Oct. 29, 2010), 9 pages.
"PCT Search Report", PCT Application No. PCT/US01/15581, (Jan. 29, 2003), 3 pages.
Sato, T. et al., "XFIG Version 3.2 Patchlevel 2 Users Manual Edition 1.0", Available at http://tinf2.vub.ac.be/~dvermeir/manuals/xfid/lib/X11/xfig/html/index.html, (Jul. 2, 1998), 37 pages.
"Final Office Action", U.S. Appl. No. 11/036,910, (May 26, 2010),9 pages.
"Final Office Action", U.S. Appl. No. 11/218,149, (May 19, 2010),17 pages.
"Foreign Office Action", Australian Patent Application No. 2006200285, (May 20, 2010),2 pages.
"Foreign Office Action", Russian Application No. 2006103267, (Apr. 20, 2010),10 pages.
"Foreign Office Action", Russian Application No. 2006105526, (Apr. 15, 2010),10 pages.
"Non-Final Office Action", U.S. Appl. No. 11/107,347, (Jul. 9, 2010),16 pages.
"Non-Final Office Action", U.S. Appl. No. 11/295,178, (May 26, 2010),45 pages.
"Non-Final Office Action", U.S. Appl. No. 11/567,140, (May 18, 2010),8 pages.

"Notice of Allowance", U.S. Appl. No. 10/402,640, (Jun. 15, 2010), 6 pages.
"Notice of Allowance", U.S. Appl. No. 10/916,692, (Jun. 14, 2010), 6 pages.
"Notice of Allowance", U.S. Appl. No. 11/872,703, (May 14, 2010), 18 pages.
"Supplemental Notice of Allowance", U.S. Appl. No. 11/044,106, (May 13, 2010), 6 pages.
"Supplemental Notice of Allowance", U.S. Appl. No. 11/044,106, (May 19, 2010), 5 pages.
"Notice of Allowance", U.S. Appl. No. 10/955,087, (Dec. 11, 2008), 10 pages.
"Final Office Action", U.S. Appl. No. 10/955,087, (May 16, 2008), 13 pages.
"Non Final Office Action", U.S. Appl. No. 10/955,087, (Nov. 19, 2007), 22.
"Non-Final Office Action", U.S. Appl. No. 10/988,732, (May 26, 2010), 36.
"Final Office Action", U.S. Appl. No. 10/988,732, (Nov. 13, 2009), 33 pages.
"Non-Final Office Action", U.S. Appl. No. 10/988,732, (Jun. 11, 2009), 30 pages.
"Final Office Action", U.S. Appl. No. 10/988,732, (Dec. 10, 2008), 29 pages.
"Non-Final Office Action", U.S. Appl. No. 10/988,732, (Apr. 1, 2008), 27 pages.
"Final Office Action", U.S. Appl. No. 10/955,666, (Oct. 31, 2008), 24 pages.
"Foreign Office Action", EP Application No. 01935325.9, (Jul. 20, 2010), 6 pages.
Burch, Barbara "Notes R5 Technical Overview", Retrieved from: <http://www.ibm.com/developerworks/lotus/library/1s-Notes R5 Technical Overview> on Aug. 13, 2010, (Apr. 1, 1999), 14 pages.
"Non Final Office Action", U.S. Appl. No. 10/955,666, (Feb. 4, 2008), 20 pages.
"Final Office Action", U.S. Appl. No. 10/955,666, (Aug. 30, 2007), 19 pages.
"Non Final Office Action", U.S. Appl. No. 10/955,666, (Dec. 26, 2006), 20 pages.
"Non-Final Office Action", U.S. Appl. No. 10/955,665, (Sep. 11, 2008), 16 pages.
"Final Office Action", U.S. Appl. No. 10/977,198, (Sep. 3, 2008), 13 pages.
"Non Final Office Action", U.S. Appl. No. 10/977,198, (Jan. 10, 2008), 10 pages.
"Final Office Action", U.S. Appl. No. 10/977,198, (Oct. 11, 2007), 10 pages.
"Non Final Office Action", U.S. Appl. No. 10/977,198, (Mar. 9, 2007), 9 pages.
"Issue Notification", U.S. Appl. No. 10/988,718, (Aug. 12, 2009), 1 page.
"Final Office Action", U.S. Appl. No. 10/988,718, (Dec. 22, 2008), 17 pages.
"Non Final Office Action", U.S. Appl. No. 10/988,718, (Jul. 21, 2008), 18 pages.
"Final Office Action", U.S. Appl. No. 10/988,718, (Jan. 30, 2008), 15 pages.
"Non Final Office Action", U.S. Appl. No. 10/988,718, (Jul. 26, 2007), 21 pages.
"Non Final Office Action", U.S. Appl. No. 10/988,718, (Jan. 25, 2007), 13 pages.
"European Search Report", EP Application No. 06111546.5, (Nov. 9, 2006), 5 pages.
"Non-Final Office Action", U.S. Appl. No. 11/036,910, (Aug. 19, 2010), 8 pages.
"Final Office Action", U.S. Appl. No. 11/227,550, (Aug. 19, 2010), 12 pages.
"Final Office Action", U.S. Appl. No. 11/567,140, (Aug. 19, 2010), 10 pages.
"Foreign Office Action", Japanese Application No. 2002-530701, (Aug. 10, 2010), 11 pages.
"Lotus Notes Release 5, Step by Step", *Lotus Development Corporation*, (1999), 224 pages.

"Final Office Action", U.S. Appl. No. 10/988,732, (Nov. 12, 2010), 37 pages.
"Foreign Office Action", Japanese Application No. 2006-071589, (Mar. 29, 2011), 9. pages
"Supplemental Notice of Allowance", U.S. Appl. No. 11/931,730, (Apr. 22, 2011), 2 pages.
"Final Office Action", U.S. Appl. No. 12/061,613, (Apr. 28, 2011), 11 pages.
"Supplemental Notice of Allowance", U.S. Appl. No. 11/931,730, (May 6, 2011), 2 pages.
"Notice of Reexamination", Chinese Application No. 01813138.7, (Apr. 22, 2011), 14 pages.
"Foreign Office Action", Japanese Application No. 2002-503700, (May 10, 2011), 5 pages.
Hall, Richard S., "Evaluating Software Deployment Languages and Schema", In Proceedings of International Conference on Software Maintenance, (Nov. 1998), 9 pages.
Hall, Richard S., et al., "Specifying the Deployable Software Description Format in XML", CU-SERL-207-99, Software Engineering Research Laboratory, University of Colorado at Boulder, (Mar. 31, 1999), 17 pages.
"Advisory Action", U.S. Appl. No. 10/185,048, (Jun. 20, 2006), 3 Pages.
"Advisory Action", U.S. Appl. No. 10/185,048, (Sep. 16, 2005), 3 Pages.
"Advisory Action", U.S. Appl. No. 10/632,437, (Aug. 23, 2006), 3 pages.
"Advisory Action", U.S. Appl. No. 10/916,692, (Dec. 10, 2008), 3 Pages.
"Applicants' Statement Regarding a Non-Public Use", (May 31, 2006), 1 page.
"EP Search Report", EP Application No. 00306806, (Jul. 16, 2003), 3 pages.
"EP Search Report", EP Application No. 97307138, (Mar. 21, 2003), 3 pages.
"Final Office Action", U.S. Appl. No. 10/185,048, (Mar. 13, 2006), 14 Pages.
"Final Office Action", U.S. Appl. No. 10/185,048, (Jun. 3, 2005), 14 Pages.
"Final Office Action", U.S. Appl. No. 10/632,437, (Jan. 25, 2008), 25 pages.
"Final Office Action", U.S. Appl. No. 10/632,437, (Jun. 1, 2006), 21 pages.
"Final Office Action", U.S. Appl. No. 10/781,586, (Aug. 9, 2007), 20 pages.
"Final Office Action", U.S. Appl. No. 10/876,418, (May 22, 2008), 14 pages.
"Final Office Action", U.S. Appl. No. 10/916,692, (Oct. 2, 2008), 10 Pages.
"Final Office Action", U.S. Appl. No. 11/095,254, (Dec. 22, 2008), 9 pages.
"Foreign Office Action", Japanese Application 2002-504575, (Dec. 14, 2010), 4 pages.
"Non Final Office Action", U.S. Appl. No. 09/599,806, (Mar. 12, 2003), 7 pages.
"Non Final Office Action", U.S. Appl. No. 09/599,806, (Aug. 17, 2004), 5 pages.
"Non Final Office Action", U.S. Appl. No. 10/395,505, (Sep. 11, 2006), 8 pages.
"Non Final Office Action", U.S. Appl. No. 10/632,437, (Dec. 16, 2005), 22 pages.
"Non Final Office Action", U.S. Appl. No. 10/632,437, (Jul. 26, 2007), 19 pages.
"Non Final Office Action", U.S. Appl. No. 10/632,437, (Sep. 10, 2008), 28 pages.
"Non Final Office Action", U.S. Appl. No. 10/770,240, (Aug. 24, 2004), 25 pages.
"Non-Final Office Action", U.S. Appl. No. 10/185,048, (Dec. 8, 2004), 14 pages.
"Non-Final Office Action", U.S. Appl. No. 10/610,504, (Mar. 9, 2006), 12 pages.
"Non-Final Office Action", U.S. Appl. No. 10/781,586, (Oct. 20, 2006), 21 pages.

"Non-Final Office Action", U.S. Appl. No. 10/871,586, (Jan. 9, 2008),22 pages.
"Non-Final Office Action", U.S. Appl. No. 10/876,418, (Sep. 13, 2007),14 pages.
"Non-Final Office Action", U.S. Appl. No. 10/916,692, (Apr. 1, 2008),9 pages.
"Non-Final Office Action", U.S. Appl. No. 11/095,254, (Apr. 17, 2008),8 pages.
"Non-Final Office Action", U.S. Appl. No. 12/028,651, (Jan. 3, 2011),16 pages.
"Notice of Allowance", U.S. Appl. No. 09/599,806, (Jan. 21, 2005),9 pages.
"Notice of Allowance", U.S. Appl. No. 10/395,505, (Oct. 4, 2006),8 pages.
"Notice of Allowance", U.S. Appl. No. 10/610,504, (Sep. 6, 2006),4 Pages.
"Notice of Allowance", U.S. Appl. No. 10/632,437, (May 21, 2009),15 pages.
"Notice of Allowance", U.S. Appl. No. 10/781,586, (May 9, 2008),6 pages.
"Notice of Allowance", U.S. Appl. No. 10/876,418, (Dec. 31, 2008),8 pages.
"Notice of Allowance", U.S. Appl. No. 11/107,347, (Dec. 13, 2010),11 pages.
"Notice of Allowance", U.S. Appl. No. 11/218,149, (Feb. 11, 2011),7 pages.
"Notice of Allowance", U.S. Appl. No. 11/931,730, (Feb. 2, 2011),7 pages.
"OLE Open Doc and Network", Retrieved from http://www.pcwebopedia.com on May 9, 2006 Webopedia entries,(May 16, 1998),7 pages.
"PCT Search Report", PCT Application No. PCT/IB98/01392, (Apr. 9, 1999),3 pages.
"PCT Search Report", PCT Application No. PCT/IB99/02003, (Nov. 28, 2000),3 pages.
"PCT Search Report", PCT Application No. PCT/US99/09620, (Sep. 22, 1999),3 pages.
"Restriction Requirement", U.S. Appl. No. 09/599,806, (Mar. 3, 2003),5 pages.
"Restriction Requirement", U.S. Appl. No. 10/770,240, (Jan. 26, 2009),7 pages.
"Restriction Requirement", U.S. Appl. No. 10/781,586, (Jun. 26, 2006),5 pages.
"Restriction Requirement", U.S. Appl. No. 11/095,254, (Nov. 1, 2007),8 pages.
"Supplemental Notice of Allowance", U.S. Appl. No. 10/781,586, (Jul. 18, 2008),3 pages.
"Supplemental Notice of Allowance", U.S. Appl. No. 10/781,586, (Jun. 4, 2008),2 pages.
"Supplemental Notice of Allowance", U.S. Appl. No. 11/036,910, (Jan. 5, 2011),2 pages.
"Supplemental Notice of Allowance", U.S. Appl. No. 12/021,894, (Jan. 12, 2011),6 pages.
"Supplemental Notice of Allowance", U.S. Appl. No. 12/021,894, (Feb. 8, 2011),6 pages.
Asche, Ruediger R., "Multithreading for Rookies", *Microsoft Developer Network Technology Group*, Retrieved Apr. 17, 2002 from http://msdn.microsoft.com/library/en-us/dndllpro/html/msdn_threads.asp?frame=true, (Sep. 24, 1993),13 pages.
Baldwin, J F., et al., "A Mass Assignment Based ID3 Algorithm for Decision Tree Introduction", *International Journal of Intelligent Systems*, vol. 12, No. 7 (1997),pp. 523-548.
Cloete, I et al., "CID3: An Extension of ID3 for Attributes with Ordered Domains", *South African Computer Journal*, vol. 4, (1991),pp. 10-16.
Kath, Randy "Managing Virtual Memory in Win32", *Microsoft Developer Network Technology Group*, Retrieved Apr. 17, 2002 from http://msdn.microsoft.comilibrary/en-us/dngenlib/html/msdn_virtmm.asp?frame=true, (Jan. 20, 1993),9 pages.
Mehta, Manish et al., "SLIQ: A Fast Scalable Classifier for Data Mining", available at <<http://www.dbis.informatik.hu-berlin.de/dbisold/lehre/WS0405/KDD/paper/MAR96.pdf>>, (Mar. 1996),15 Pages.

Sebastiani, F "A Tutorial on Automated Text Categorization", In Analia Amandi and Ricardo Zunino, editors, Proceedings of ASAI-99, *1st Argentinean Symposium on Artificial Intelligence*, Buenos Aires, AR, (1999),pp. 7-35.
Zaki, Mohammed J., et al., "Parallel Classification for Data Mining on Shared-Memory Multiprocessors", *ACM* (Mar. 1999),pp. 1-8.
"Adobe GoLive 5.0: User Guide," Adobe Systems, 2000, Chapter 12., (2000),11 pages.
"Advisory Action", U.S. Appl. No. 11/036,910, (Sep. 10, 2009),3 pages.
"European Search Report", EP Application No. 10012887.5, (Jul. 4, 2011),12 pages.
"Final Office Action", U.S. Appl. No. 10/770,240, (Apr. 13, 2011),17 pages.
"Final Office Action", U.S. Appl. No. 10/770,240, (Jun. 26, 2009),15 pages.
"Final Office Action", U.S. Appl. No. 10/770,240, (Jun. 29, 2007),28 pages.
"Final Office Action", U.S. Appl. No. 10/938,476, (Jun. 20, 2011),19 pages.
"Final Office Action", U.S. Appl. No. 12/126,532, (Oct. 14, 2011),25 pages.
"Foreign Notice of Allowance", Canadian Application No. 2412611, (Sep. 19, 2011),1 page.
"Foreign Notice of Allowance", Japanese Application No. 2002-504581, (Sep. 16, 2011),6 pages.
"Foreign Office Action", Canadian Application No. 2408527, (Sep. 27, 2011),3 pages.
"Foreign Office Action", Japanese Application No. 2002-503700, (Aug. 30, 2011),4 pages.
"Foreign Office Action", Japanese Application No. 2002-504581, (Dec. 17, 2010),24 pages.
"Foreign Office Action", Japanese Application No. 2002-504581, (May 27, 2011),6 pages.
"Foreign Office Action", Japanese Application No. 2006-060050, (Aug. 26, 2011),4 pages.
"Non Final Office Action", U.S. Appl. No. 10/770,240, (Oct. 29, 2010),14 pages.
"Non Final Office Action", U.S. Appl. No. 10/770,240, (May 1, 2008),30 pages.
"Non Final Office Action", U.S. Appl. No. 10/770,240, (May 13, 2010),15 pages.
"Non Final Office Action", U.S. Appl. No. 10/770,240, (Aug. 24, 2006),25 pages.
"Non Final Office Action", U.S. Appl. No. 11/036,910, (Oct. 2, 2008),7 pages.
"Non-Final Office Action", U.S. Appl. No. 10/011,150, (May 19, 2005),7 pages.
"Notice of Allowance", U.S. Appl. No. 10/011,150, (Dec. 16, 2005),4 pages.
"Notice of Allowance", U.S. Appl. No. 11/567,140, (Oct. 11, 2011),11 pages.
"Notice of Allowance", U.S. Appl. No. 11/927,296, (Aug. 8, 2011),7 pages.
"Notice of Allowance", U.S. Appl. No. 12/249,973, (Sep. 28, 2011),9 pages.
"Restriction Requirement", U.S. Appl. No. 10/011,150, (Dec. 15, 2004),5 pages.
"Supplementary European Search Report", Application No. 04779161.1, (Jul. 14, 2011),4 pages.
"Tei: P4 Guidelines", *TEI Consortium*, (Mar. 2002),340 pages.
"Text Encoding Initiative", *TEI Consortium*, (Mar. 2002),1 page.
Duce, et al., "Web 2D Graphics File Formats", Google 2003, (2003),pp. 43-65.
Idle, et al., "Outline of the International Standard Linguistic Annotation Framework", *Proceedings of the ACL 2003 workshop on Linguistic Annotation*, (Jul. 2003),5 pages.
Mengel, A et al., "MATE Dialogue Annotation Guidelines", http://www.ims.uni-stuttgart.ed/projekte/mate/mdag, (Jan. 8, 2000),64 pages.
Zdonik, Stanley B., "Object Management System Concepts", *Supporting Integrated Office Workstation Application, Doctoral Thesis, Massachusetts Institute of Technology*, (1983),262 pages.

"Final Office Action", U.S. Appl. No. 10/609,274, (Oct. 3, 2008),50 pages.

"Final Office Action", U.S. Appl. No. 10/609,274, (Oct. 31, 2007),41 pages.

"Final Office Action", U.S. Appl. No. 11/927,296, (Jul. 7, 2011),12 pages.

"Foreign Office Action", European Patent Application No. 01935325.9, (Jun. 20, 2011),5 pages.

"Foreign Office Action", Japanese Application No. 2002-503701, (May 31, 2011),10 pages.

"Non Final Office Action", U.S. Appl. No. 10/609,274, (Jan. 17, 2007),43 pages.

"Non Final Office Action", U.S. Appl. No. 10/609,274, (Apr. 2, 2008),43 pages.

"Supplemental Notice of Allowance", U.S. Appl. No. 11/107,347, (Jun. 10, 2011),10 pages.

"Supplemental Notice of Allowance", U.S. Appl. No. 11/218,149, (Jun. 6, 2011),2 pages.

Moats, R. "A URN Namespace for IETF Documents", *RFC 2648*, (Aug. 1999),pp. 1-30.

Moats, R. "URN Syntax", *RFC 2141*, (May 1997),pp. 1-8.

Sollins, et al., "Functional Requirements for Uniform Resource Names", *RFC 1737* (Dec. 1994),pp. 1-7.

"Adobe GoLive 5.0: User Guide," Adobe Systems, 2000, Chapter 12., (2000), 11 pages.

"Advisory Action", U.S. Appl. No. 11/036,910, (Sep. 10, 2009), 3 pages.

"European Search Report", EP Application No. 10012887.5, (Jul. 4, 2011), 12 pages.

"Final Office Action", U.S. Appl. No. 10/770,240, (Apr. 13, 2011), 17 pages.

"Final Office Action", U.S. Appl. No. 10/770,240, (Jun. 26, 2009), 15 pages.

"Final Office Action", U.S. Appl. No. 10/770,240, (Jun. 29, 2007), 28 pages.

"Final Office Action", U.S. Appl. No. 12/126,532, (Oct. 14, 2011), 25 pages.

"Foreign Notice of Allowance", Canadian Application No. 2412611, (Sep. 19, 2011), 1 page.

"Foreign Notice of Allowance", Japanese Application No. 2002-504581, (Sep. 16, 2011), 6 pages.

"Foreign Office Action", Canadian Application No. 2408527, (Sep. 27, 2011), 3 pages.

"Foreign Office Action", Japanese Application No. 2002-503700, (Aug. 30, 2011), 4 pages.

"Foreign Office Action", Japanese Application No. 2002-504581, (Dec. 17, 2010), 24 pages.

"Foreign Office Action", Japanese Application No. 2002-504581, (May 27, 2011), 6 pages.

"Foreign Office Action", Japanese Application No. 2006-060050, (Aug. 26, 2011), 4 pages.

"Non Final Office Action", U.S. Appl. No. 10/770,240, (Oct. 29, 2010), 14 pages.

"Non Final Office Action", U.S. Appl. No. 10/770,240, (May 13, 2010), 15 pages.

"Non Final Office Action", U.S. Appl. No. 11/036,910, (Oct. 2, 2008), 7 pages.

"Non-Final Office Action", U.S. Appl. No. 10/011,150, (May 19, 2005), 7 pages.

"Notice of Allowance", U.S. Appl. No. 10/011,150, (Dec. 16, 2005), 4 pages.

"Notice of Allowance", U.S. Appl. No. 11/567,140, (Oct. 11, 2011), 11 pages.

"Notice of Allowance", U.S. Appl. No. 11/927,296, (Aug. 8, 2011), 7 pages.

"Notice of Allowance", U.S. Appl. No. 12/249,973, (Sep. 28, 2011), 9 pages.

"Restriction Requirement", U.S. Appl. No. 10/011,150, (Dec. 15, 2004), 5 pages.

Zdonik, Stanley B., "Object Management System Concepts", *Supporting Integrated Office Workstation Applications, Doctoral Thesis, Massachusetts Institute of Technology*, (1983), 262 pages.

"Foreign Office Action", Japanese Application No. 2002-503701, (Mar. 16, 2012), 3 pages.

"Non-Final Office Action", U.S. Appl. No. 12/061,613, (Mar. 16, 2012), 12 pages.

"Non-Final Office Action", U.S. Appl. No. 12/694,836, (Mar. 9, 2012),30 pages.

Dubinko, et al., "XForms 1.0", W3C Recommendation, Retrieved from: <www.w3.org.TR/2003/REC-xforms-20031014/> on Feb. 29, 2012, (Oct. 14, 2003), 35 pages.

* cited by examiner

300

302

| File | Edit | View | Insert | Format | Tools | Table | Help |

| Interest in continued learning | ○ | ○ | ○ | ○ | ● | ○ |

Average rating | 4.9

○ Click here to insert the Clerical Skills section
○ Click here to insert the Managerial Skills section
○ Click here to insert the Technical Skills section

Comments

Applicant Strengths:

PhD from Duke.

Applicant Weaknesses:

None.

Comments:

Dr. Jorgens is an excellent candidate for Software Developer.

Hiring Recommendation

○ No recommendation  ○ Don't hire  ● Hire

304

🖉 Click here to sign this section

Fig. 3

DIGITAL SIGNATURES FOR NETWORK FORMS

BACKGROUND

Digital signatures are valid substitutes to traditional inked signatures in many countries. Digital signatures, like inked signatures, may be used as evidence to show that a particular body of data was signed.

Generally, an individual may digitally sign data with an identifier that uniquely identifies that individual. Some identifiers, for example, include a cryptographic private key associated with a public certificate issued by a trusted certification authority to an individual. A unique identifier used to digitally sign data may later be used as evidence that this particular individual signed the data and that the data has not been tampered with since being signed. To help keep this identifier secure, many people store it on their local computer or on an external device, such as in a machine-readable card.

To sign data when software enabling the signature is not accessible locally, however, an individual's unique identifier may have to be accessed by a remote computer. But making a unique identifier remotely accessible, whether by storing the unique identifier remotely, sending it across a network, or otherwise, may compromise its security.

For example, data of network-accessed electronic documents, often called "network forms," is primarily processed by network computers rather than individuals' local computers. Thus, data for network forms is often handled remotely by the network form's computer server. By so doing, the network form's computer server may perform many operations, thereby saving the individual's computer from having to do them. For instance, often the network form's computer server calculates a transform of the data to create rendering information, such as in Hyper Text Markup Language (HTML). The server then sends this information to the individual's network browser. The network browser interprets this information to render a view of the electronic document's data to the individual. The individual may then make edits through the view.

Conversely, the data itself—as opposed to rendering information based on it—is often not sent to or operated on by an individual's local computer because doing so causes various problems. To enable the individual's local computer to perform operations often done by the network form's computer server, the individual's computer often needs specialized software utilities. But having and downloading this software may have significant drawbacks, such as a local computer not having proper hardware requirements to use the software, a user not having training needed to properly use the software, and limitations to the network form caused by the software utilities being performed locally. Also, sending the software to the individual's computer may drain the resources of the network computer or cause substantial delays for the individual due to its large size relative to the rendering information.

Many network forms therefore, require that an individual's unique identifier be accessed by a remote computer for the individual to sign the network form. This access may compromise the security of the individual's unique identifier.

SUMMARY

System(s) and/or method(s) ("tools") enabling an individual to digitally sign data using an identifier where the data being digitally signed and the identifier are not accessed at the same location are described.

The tools may permit an individual to digitally sign data for an electronic document using an identifier inaccessible by a remote computer where the electronic document is rendered using view information from that remote computer.

The tools may also enable a network computer to send view information for, and a digital encoding of, an electronic document to a local computer effective to enable the local computer to digitally sign the electronic document by signing the digital encoding of the electronic document.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

FIG. 3 illustrates a screen shot showing a signable data section of an electronic document.

The same numbers are used throughout the disclosure and figures to reference like components and features.

DETAILED DESCRIPTION

Overview

This document describes tools that enable an individual to digitally sign data using an identifier where the data being digitally signed and the identifier are not accessed at the same location.

In one embodiment, for example, the tools permit an individual to digitally sign structured data for a network form where the data for the form is stored on a network computer and a unique identifier for the individual is stored on the individual's local computer. The individual may sign a network form's data through his or her local computer without the local computer needing access to a full copy of the data and without needing to permit his or her unique identifier to be accessed by a network computer. These tools may provide an individual with greater security over his or her unique identifier without requiring that the individual's local computer have access to, or be able to perform operations on, the data being signed.

These tools may also enable a network computer to build a digitally signed document without needing access to an individual signer's identifier. This digitally signed document may comprise data digitally signed using an individual's unique identifier, a view of that data, and context for that view. With this digitally signed document, a court may later determine which individual signed the data and what that individual saw when the individual signed.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to any particular operating environment.

Figure 1:
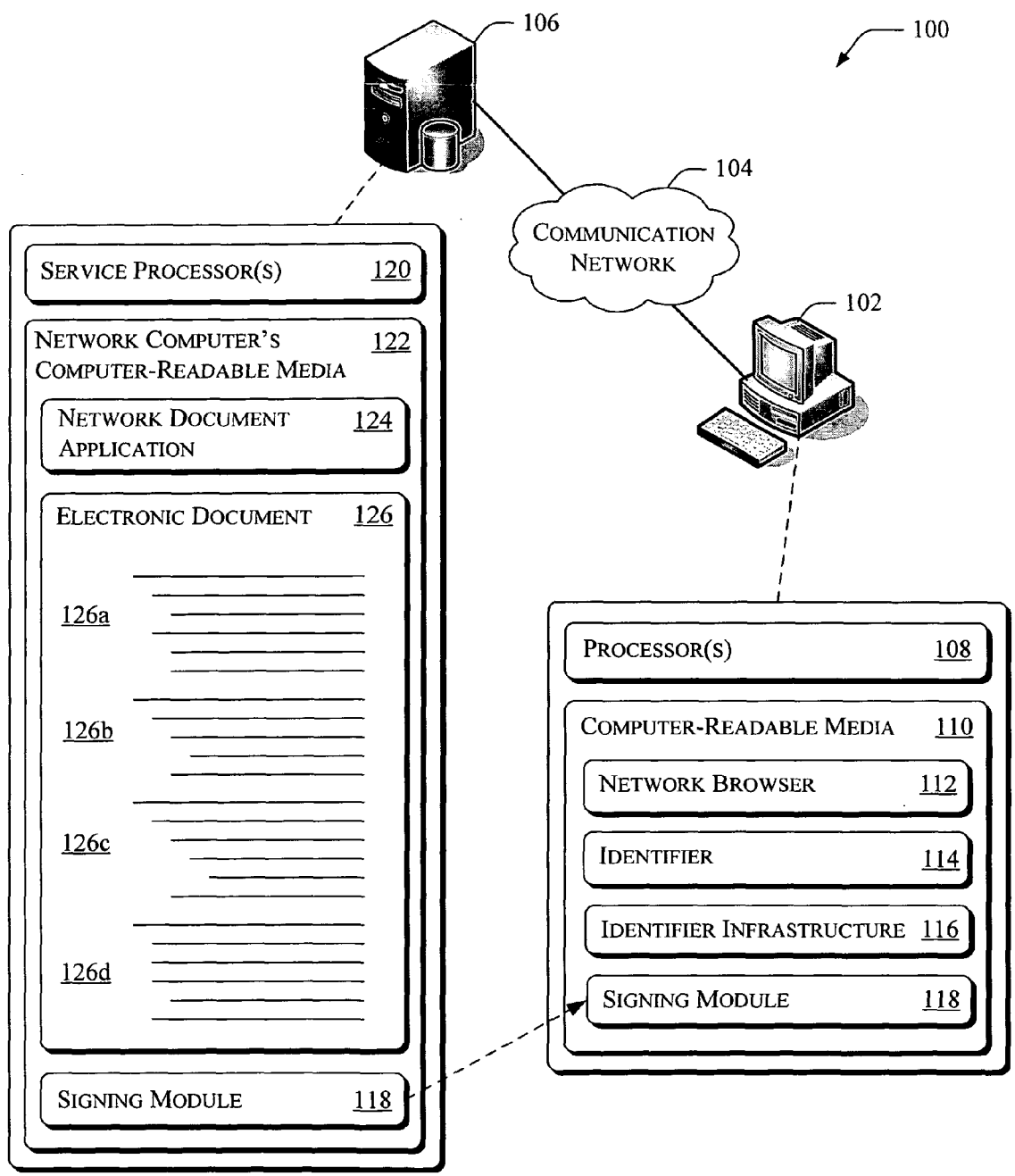
FIG. 1 illustrates an exemplary operating environment.

FIG. 1 illustrates one such operating environment generally at 100 comprising a local computer 102, a communication network 104, and a network computer 106. The network permits communication, wireless or otherwise, between the local computer and the network computer, and may comprise an intranet and/or the Internet.

The local computer may comprise a desktop, laptop, PDA, cell phone, or other computing device. The local computer is shown comprising one or more processors 108 and computer-readable media 110. The processor is capable of accessing and/or executing the computer-readable media configured as computer-readable storage media to store computer-readable instructions. The local computer's computer-readable media comprises a network browser 112, such as Microsoft® Internet Explorer™, an identifier 114 (e.g., a private key of a cryptographic Public Key Infrastructure (PKI)), an identifier infrastructure 116 (e.g., a Public Key Infrastructure), and a signing module 118.

Network computer 106 is shown comprising one or more service processors 120 and computer-readable media 122. Computer-readable media 122 can be configured as computer-readable storage media to store computer-readable instructions executable by the one or more service processors 120. Computer-readable media 122 comprises a network document application 124, an electronic document 126, and, in some cases, signing module 118. In this exemplary operating environment, the electronic document comprises hierarchically structured data written using a tag-based language, such as eXtensible Markup Language (XML), though other structures and languages may be used. It is shown divided into signable data sections 126a, 126b, 126c, and 126d of structured data.

Network document application 124 supports and handles operations for the electronic document. It is capable of transforming the electronic document to generate view information usable by the local computer's network browser to render a view of the electronic document. It is also capable of performing various other operations for, or relating to, the electronic document, such as calculations, data connections, business logic, building of digitally signed documents, and the Exemplary Embodiments for Digitally Signing Data The following discussion describes exemplary ways of enabling an individual to digitally sign an electronic document's data. These embodiments are described in the context of operating environment 100 for illustrative purposes and are not limited to this operating environment.

In some cases described below, the individual may digitally sign the electronic document's data where the data being digitally signed is not accessed by local computer 102 and identifier 114 is not accessed by network computer 106.

Figure 2:
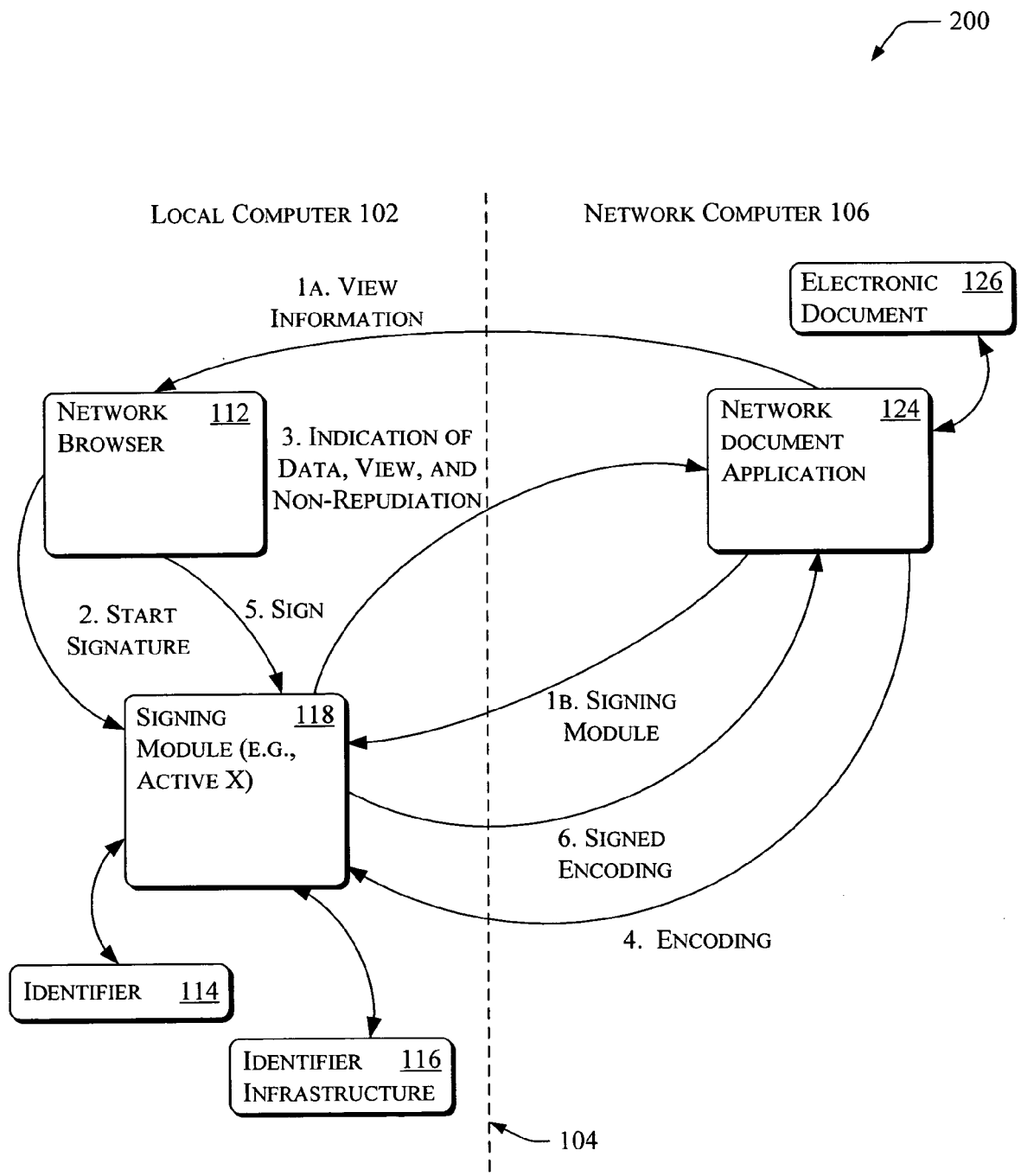
FIG. 2 sets forth an exemplary flow diagram for digitally signing data.

Referring to FIG. 2, an exemplary flow diagram 200 for enabling an individual to digitally sign data is shown. Flow diagram 200 illustrates a set of actions by, and accompanying communications between, elements of the environment 100, such as network browser 112, signing module 118, and network document application 124. The actions and accompanying communications are marked with arrows between the elements. The flow diagram is oriented showing elements accessed by local computer 102, elements accessed by network computer 106, and communication between them through network 104, represented with a dashed line. Communications made over the network are shown by arrows passing through the dashed line.

At arrow 1a, network document application 124 sends view information to network browser 112. This view information may be used by the network browser to render a view of the electronic document's data to the individual and may comprise HTML (Hyper Text Machine Language). The network document application may send this view information in response to a request by the individual to see, edit, or sign the electronic document serviced by the network computer. To generate this view information, the network document application may transform eXtensible Markup Language (XML) data of the electronic document (shown in FIG. 2 at 126) using an XSLT (eXtensible Stylesheet Language Transformation) file or other suitable technique.

Along with arrow 1a, the network document application may also send signing module 118 to the local computer at arrow 1b. In some cases this signing module is sent at some other time or is already accessible by the local computer. This signing module may comprise an ActiveX control or an applet, for example. The network browser interprets this view information to render the electronic document's data.

Referring to FIG. 3, a screen shot 300 showing a portion 302 of the electronic document 126 is shown. This portion 302 shows a view of part of signable data section 126a of the electronic document. It also shows a selector 304 by which a user may select to initiate a signing process of this data section 126a (or, in another embodiment, sign the data section). This illustrated embodiment describes an individual signing a portion of electronic document 126, though all of the electronic document may also be signed.

Returning to FIG. 2, at arrow 2, the network browser communicates with the signing module indicating that the individual has initiated a process to sign the data section.

The signing module, at arrow 3, records the data selected for signing, a view of the data, and non-repudiation information. It communicates these to the network document application. The view may comprise a static image showing in what way and to what extent the data section 126a was presented to the individual. In the illustrated embodiment the view comprises the portion 302 of the electronic document, shown in FIG. 3.

In some cases the view seen by the individual may be different than one seen by another individual using another computer, even if the view information sent to the browsers and the data are the same. Thus, information giving context for the view seen by an individual may help to prevent a signer from repudiating his or her signature. The signing module may determine what computer environment is necessary to recreate the view of the data section 126a, such as specifications of the computer environment, like a system date, time, and time-zone; versions of the operating system, network document application, network browser, and signing module; number and type of monitors; and/or the like. Using this environment information, the static view associated with the digital signature can later be verified by recreating that view from the signed data with the described computer environment.

The signing module records a static image of the screen shot (e.g., as a portable network graphic (PNG) file) and sends this static image to the network document application along with the non-repudiation information sufficient to recreate the view. The signing module also sends an indication of what portion of the data of the electronic document is being signed.

At arrow 4, the network document application digitally encodes (e.g., calculates a strong cryptographic hash of) the data selected for signature. This encoding is effective to lock the data so that it may not be altered without breaking the encoding. The encoding may also be calculated over the static view and the non-repudiation information. The network document application then sends this encoding—though not necessarily the data—to the signing module, which is shown with arrow 4 in FIG. 2. This encoding may be small and require few resources to send to, or be received by, the local computer. Thus, the local computer may easily receive the encoding of the data, which is often smaller and more easily received that the data itself. It may also potentially save the local computer from having to have software capable of performing operations on the data, such as creating view information for, or an encoding of, the data.

Figure 4:
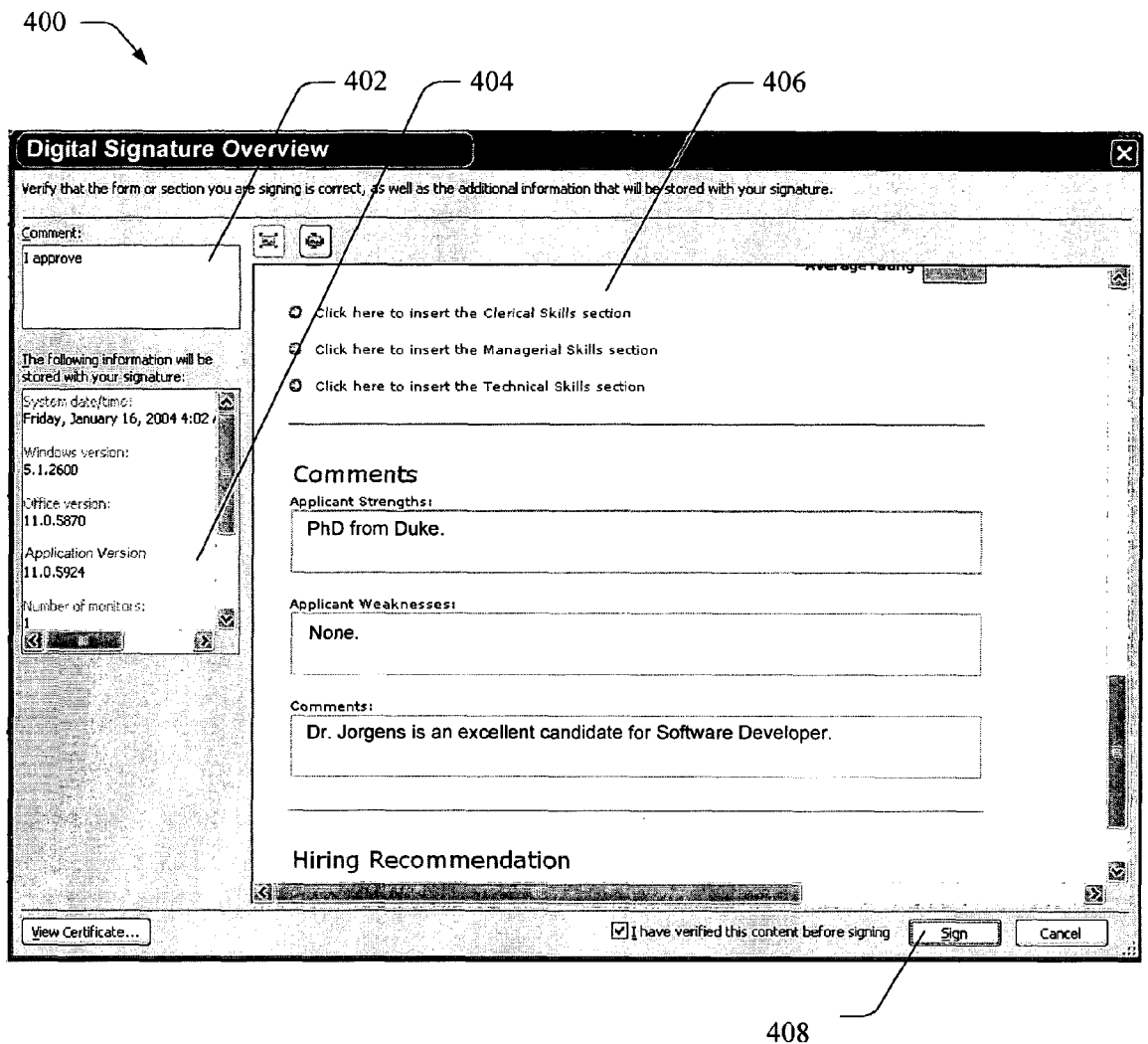
FIG. 4 illustrates an exemplary signing overview dialog box showing exemplary information includable within a digitally signed document.

Referring to FIG. 4, a screen shot 400 with an exemplary view of information that will be signed is shown. The screen shot shows comments from the potential signer at 402, non-repudiation information 404, and a portion of a static view 406 of the signable data section 126*a*.

Returning to FIG. 2, at arrow 5 the network browser and/or the signing module enables the individual to sign the data. Continuing the illustrated embodiment, the individual may sign the data by selecting sign button 408 of FIG. 4.

Responsive to the individual's selection to sign the data, the signing module, at arrow 6, digitally signs the encoding. The signing module may do so using identifier 114 and identifier infrastructure 116. The signing module may use a private key to digitally sign the encoding thereby signing the selected data. To enable the encoding to be verified, the signing module also adds a public certificate associated with the identifier infrastructure. The signing module sends this signed encoding to the network document application.

Exemplary Embodiment for Building a Digitally Signed Document

The following discussion describes exemplary ways in which elements of operating environment 100 build a digitally signed document using a signed encoding. In some cases, the tools enable a network computer to build a digitally signed document without needing access to an individual signer's identifier.

Continuing the illustrated embodiment, network document application 124 may associate the signed encoding with signable data section 126*a*. Here, the network document application builds a file effective to associate the signed encoding, the static view of the data, comments (if made), and the non-repudiation information with the data that was signed.

Figure 5:
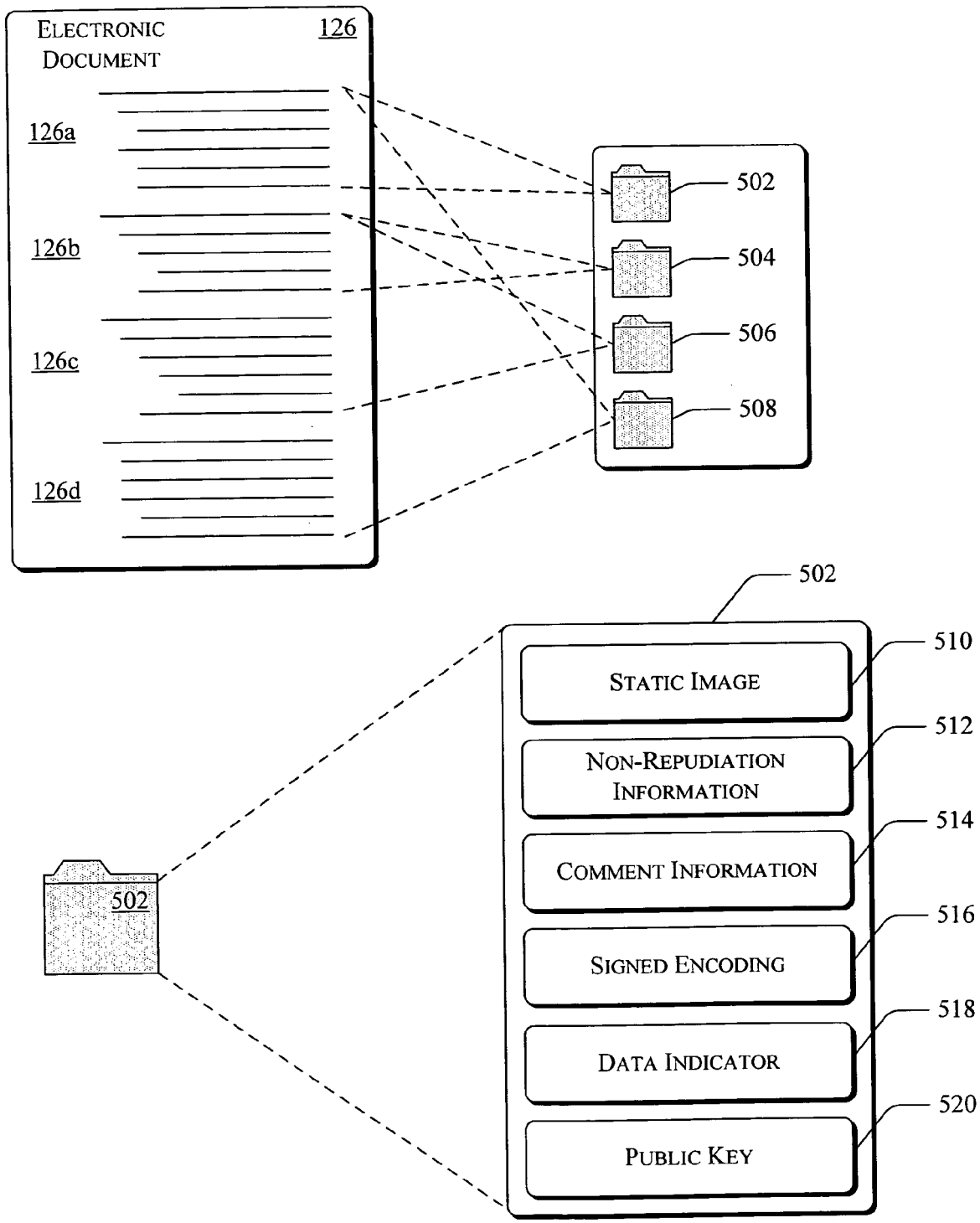
FIG. 5 illustrates an exemplary electronic document and a digitally signed document.

Referring to FIG. 5, signable data sections 126*a*, 126*b*, 126*c*, and 126*d* relate to various signed documents 502, 504, 506, and 508, these relationships shown with dashed lines. The network document application associates the signed encoding with the signable data section selected by the individual. It may associate the signed encoding while permitting the data to be reused or re-signed. This association, as shown in FIG. 5, may comprise a mapping to the signed data section. It may also comprise storing the digitally signed document within the structured data of the electronic document. This signed document may be built having a static view of the data when signed, non-repudiation information, the signed encoding, comments, and an indication of what data was signed. This indication may comprise an expression showing what part of the electronic document is signed, such as an XML Path (XPath) expression or an XSLT (extensible Stylesheet Language Transformation).

An exemplary digitally signed document is illustrated with signed signature block 502 comprising a static image 510, non-repudiation information 512, comment information 514, a signed encoding 516, a data indicator 518, and a public key 520 (e.g., a public certificate that is the counter-part of the private key that was used to sign the data and may be used to verify the signature). The data indicator indicates which part, here the signable data section 126*a*, that is signed by the digital signature.

These signed documents can be structured to conform to the XML Signatures standard prescribed by the World Wide Web Consortium (W3C).

Signing Data and Building a Digitally Signed Document

Figure 6:
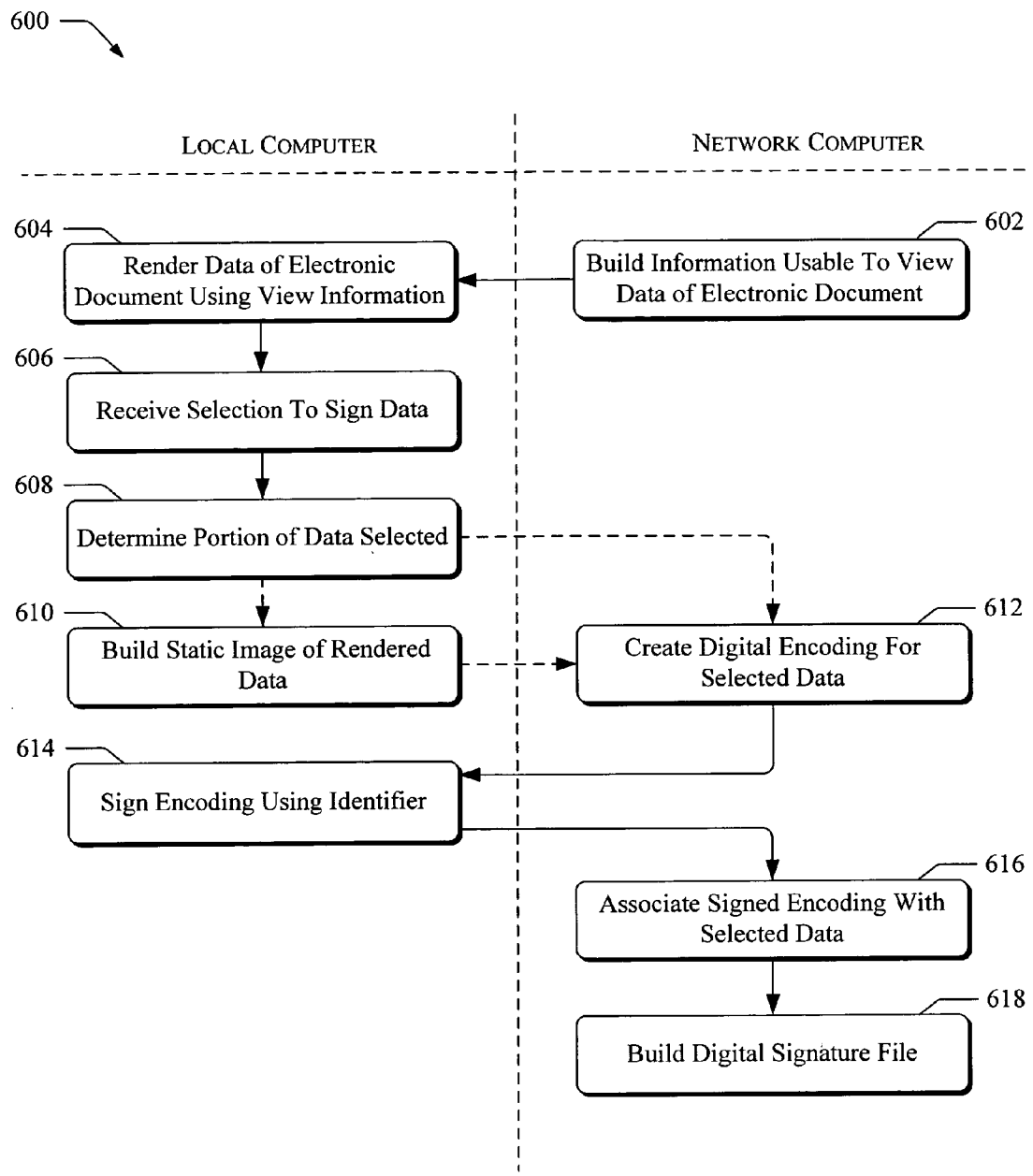
FIG. 6 sets forth an exemplary process for signing data and building a digitally signed document.

Referring to FIG. 6, a process 600 for signing data and building a digitally signed document is shown. This process may be implemented in any suitable hardware, software, firmware, or combination thereof. In the case of software and firmware, this process represents sets of operations implemented as computer-executable instructions.

At block 602, a network computer or other computing device remote from a local computer builds information usable to view data of an electronic document. This view information may be created by transforming structured data of the electronic document or in other ways described or shown herein. The network computer may then communicate this view information across a network to a local computer.

At block 604, a local computer renders data of an electronic document using view information. The view information may be received from a remote source, such as the network computer of block 602. The data of the electronic document may be remotely stored and not accessed by the local computer. The local computer may render the data using the view information with a naked network browser (e.g., a browser without plug-ins, ActiveX controls, etc.) or in other ways described or shown herein.

At block 606, the local computer receives a selection from an individual to sign some or all of the rendered data. The selection may indicate an individual's desire to start a process for signing rendered data or to sign the data without further interaction from the individual. The local computer may receive the selection in various suitable manners, such as those described or shown herein.

At block 608, a portion of the rendered data selected to be signed is determined. This determination may be inherent in the rendered view, such as by a manner or selection being associated with a particular portion of rendered data. This determination, in some cases, is trivial, such as when the selection is to sign all data of an electronic document. In this case, the selection indicates that all of the data of the electronic document is selected for signing.

In some embodiments, the determination results in an indication that is a transformation identifying the data signed or to be signed, such as by pointing to part or all of the electronic document. This transformation may indicate a particular subtree or subtrees of the electronic document to which the digital signature pertains.

The local computer may proceed to or skip block 610, depending on whether a static image of the data is built.

At block 610, the local computer may build a static image of the rendered data. The static image may be a non-interpretable graphics file showing the rendered data at the moment the individual selected to sign the rendered data. It may also comprise a view showing more or less than a rendering of the data selected to be signed. In this case, the static view may not precisely match another way or manner of viewing the data if the data is rendered by a different computer system.

The local computer may also build or collect other information. This information may comprise context sufficient to help verify that the static image is what the individual viewed when the individual selected to sign the data. The information may also comprise comments by the individual, which may be received through suitable manners like a dialog box and the like. The local computer also may build the static image and collect other information in other ways described or shown herein.

The local computer may send to the network computer an indication of the data selected to be signed, the built static image, contextual information, and comments.

At block 612, the network computer creates a digital encoding for data selected to be signed. This encoding may comprise a strong cryptographic hash of the data stored or accessed by the network computer or other information as shown or described herein. The network computer may also separately or jointly create a digital encoding of a static image of the selected data (if acts of block 610 are performed), contextual information for that static image, the individual's comments and the like. One embodiment of this digital encoding is described and shown elsewhere herein. The network computer then sends the digital encoding to the local computer.

At block 614, the local computer signs the digital encoding. The local computer may sign the digital encoding with a locally accessible identifier for the individual, such as a private key that uniquely identifies the individual. Also as part of this act of signing, the local computer may attach or associate the signed, digital encoding with a public identifier, such as a public certificate (e.g., public key 520) associated with the private key. This identifier may remain remotely inaccessible as part of this signing. The local computer then sends this signed, digital encoding to the network computer along with the public identifier.

At block 616, the network computer associates the signed, digital encoding with the selected data. The data selected may be determined by the local computer, such as at block 608, with an indication of this sent to the network computer. In some cases, however, the data selected may be determined by the network computer, such as when the electronic document having the data is known by the network computer to have a single option for signing, such as only one portion of the electronic document or all of the electronic document. A particular part of the data of the electronic document may also be signed, such as is described and shown elsewhere herein.

At block 618, the network computer builds a digitally signed document. This digitally signed document comprises the signed, digital encoding. It may also comprise the static image of the view of the rendered data seen by the individual at signing, contextual information for the static image, and comments. Further, it may comprise an indication of the data that is signed or the signed data itself. The network computer may also build the digitally signed document as shown and described elsewhere herein.

In some cases, the network computer builds the digitally signed document effective to lock the selected data but permit it to be repurposed. Allowing signed data to be repurposed permits the signed data to be reused by processes that do not modify the signed data, allowing, for instance, other individuals to sign different portions of the signed data or the same signed data in a different presentation. For example, this may permit another individual to sign signable data section 126a, 126b, 126c, and/or 126d of the illustrated embodiment described above even if signable data section 126a has already been signed. In cases where the digitally signed document comprises the signed, digital encoding but not the signed data itself, the digitally signed document permits the signed data to be machine-read without breaking the encoding.

CONCLUSION

The techniques described above may enable an individual to digitally sign data using an identifier where the data being digitally signed and the identifier are not accessed at the same location. Doing so may permit an individual to digitally sign data of a remote computer's electronic document using an identifier inaccessible by the remote computer. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A system comprising:
one or more processing devices,
one or more computer-readable media having computer-readable instructions therein that, when executed by the one or more processing devices, cause the one or more processors to perform acts comprising:
receiving, at a local computer local to an individual, a selection from the individual to sign selected data rendered at the local computer in a view of an electronic document, the view of the electronic document being rendered using view information received from a remote computer, the selected data of the electronic document being kept remotely at the remote computer, the local computer that is used to view the electronic document and sign the selected data being unable to access or perform operations upon the selected data to be signed;
creating, as a graphic file, a static image of the view of the electronic document rendered at the local computer;
sending the static image of the view, non-repudiation information describing environment information for the local computer, and an indication of the selected data to be signed to the remote computer to cause generation of an encoding by the remote computer of the selected data including the static view;
digitally signing, at the local computer, the encoding of the selected data including the static image of the view using an identifier identifying the individual, the identifier being inaccessible by the remote computer, the encoding of the selected data being generated by and received by the local computer from the remote computer in response to the sending; and
communicating the digitally signed encoding including the static image of the view to the remote computer to cause the remote computer to form a digital signing of the electronic document by creating an association of the encoding of the selected data digitally signed at the local computer with the data of the electronic document kept remotely at the remote computer.

2. The system of claim 1, wherein the local computer renders the view information through a network browser.

3. The system of claim 1, wherein the act of digitally signing the selected data permits the selected data to be repurposed without breaking the digital signature.

4. The system of claim 1, wherein the static view comprises a screen shot of the view rendered at the local computer to enable recreation of the view by a third party for verification of the digital signing.

5. A method comprising using a computer to perform acts including:
rendering a view of an electronic document derived from view information corresponding to data to be signed, the view information being created from the data to be signed at a remote source, the data being kept at the remote source, and the computer that is used to view the electronic document and sign the data being unable to access or perform operations upon the data to be signed;

receiving, from an individual, a selection to sign the data of the electronic document;

generating, as a graphic file, a static image of the rendered view;

communicating the static image, non-repudiation information describing an environment of the computer, and an indication of the data to be signed to the remote source;

receiving, from the remote source responsive to the communicating, an encoding of the data calculated by the remote source based on the static image and the non-repudiation information;

digitally signing the encoding including the static image; and communicating the digitally signed encoding to the remote source to cause the remote source to associate the digitally signed encoding with the data kept at the remote source to form a digitally signed document the digitally signed document including the static image and context information sufficient to enable recreation of the view as seen at the computer.

6. The method of claim 5, wherein the act of receiving the selection, receiving the encoding, and digitally signing are performed at a computer local to the individual and remote from the remote source.

7. The method of claim 5, wherein the act of receiving the selection comprises receiving the selection of a portion of the data of the electronic document and wherein the encoding is of the portion of the data.

8. The method of claim 5, wherein the act of digitally signing comprises signing the encoding using an identifier capable of identifying the individual.

9. The method of claim 8/, wherein the identifier comprises a unique private key of a private key infrastructure.

10. The method of claim 8, wherein the identifier is not accessible by the remote source.

11. The method of claim 5, wherein the static view comprises a screen shot of the view as seen at the computer.

12. One or more computer-readable storage media other than signals per se storing computer-readable instructions therein that, when executed by a network computer, cause the network computer to perform acts comprising:

sending view information for an electronic document to a local computer, the view information being usable by the local computer to render a view of the electronic document's data, the electronic document's data being kept at the network computer apart from the local computer, the local computer that is used to view the electronic information and sign at least some of the electronic document's data being unable to access or perform operations upon the electronic document's data;

receiving an indication of selected data to be signed, a static image of the view created by the local computer as a graphic file, and non-describing an environment of the network computer communicated by the local computer in response to a selection to sign the electronic document's data;

building a digital encoding of the electronic document's data based upon the received indication of selected data, static image, and non-repudiation information;

sending the digital encoding of the electronic document's data to the local computer to cause the local computer to perform a signing of the digital encoding using an identifier of the local computer that remains remotely inaccessible to the network computer;

receiving, from the local computer, a digital signature of the digital encoding; and associating the digital signature received from the local computer with the electronic document's data kept at the network computer to form a digital signing of the electronic document at the network computer, the digital signing including the static image of the view to enable recreation of the view by the network computer.

13. The computer-readable storage media of claim 12, wherein the electronic document's data comprises structured data, and further comprising building the view information by transforming the structured data, the view information enabling a network browser to render the structured data.

14. The computer-readable storage media of claim 12, wherein the digital signature of the digital encoding is signed at the local computer using an identifier, the identifier capable of identifying an individual.

15. The computer-readable storage media of claim 12, further comprising building a digitally signed document, the digitally signed document comprising the digital signature of the digital encoding and an indicator of the electronic document's data to which the digital encoding relates.

16. The computer-readable storage media of claim 15, further comprising receiving contextual information associated with the static image, and wherein the act of building the digitally signed document comprises building the digitally signed document comprising the static image and the contextual information.

17. The computer-readable storage media of claim 12, wherein the act of associating the digital signature with the electronic document's data permits the electronic document's data to be repurposed without breaking the digital encoding.

18. The computer-readable storage media of claim 12, further comprising building the digital encoding having a strong cryptographic hash of the electronic document's data.

19. The computer-readable storage media of claim 12, wherein the static view comprises a screen shot of the view presented at the local computer.

* * * * *

UNITED STATES PATENT AND TRADEMARK OFFICE
CERTIFICATE OF CORRECTION

| | | |
|---|---|---|
| PATENT NO. | : 8,200,975 B2 | Page 1 of 1 |
| APPLICATION NO. | : 11/170521 | |
| DATED | : June 12, 2012 | |
| INVENTOR(S) | : O'Connor et al. | |

It is certified that error appears in the above-identified patent and that said Letters Patent is hereby corrected as shown below:

In column 8, line 13, in Claim 1, delete "devices," and insert -- devices; --, therefor.

In column 9, line 35, in Claim 9, delete "8/," and insert -- 8, --, therefor.

In column 10, line 3, in Claim 12, delete "non-describing" and insert -- non-repudiation information describing --, therefor.

Signed and Sealed this
Eighteenth Day of December, 2012

David J. Kappos
*Director of the United States Patent and Trademark Office*